(12) United States Patent
Ito et al.

(10) Patent No.: US 7,490,068 B2
(45) Date of Patent: Feb. 10, 2009

(54) APPARATUS AND METHOD FOR RENDERING DIGITAL CONTENT

(75) Inventors: Satoshi Ito, Tokyo (JP); Hideyuki Aisu, Kanagawa (JP); Tooru Kamibayashi, Kanagawa (JP); Koichiro Akiyama, Tokyo (JP); Shinichiro Hamada, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 415 days.

(21) Appl. No.: 11/076,538

(22) Filed: Mar. 10, 2005

(65) Prior Publication Data

US 2006/0095974 A1 May 4, 2006

(30) Foreign Application Priority Data

Sep. 30, 2004 (JP) ............................. 2004-287627

(51) Int. Cl.
*G06F 17/60* (2006.01)
(52) U.S. Cl. .............................. 705/59; 705/57; 705/58
(58) Field of Classification Search .................. 705/59, 705/57, 58
See application file for complete search history.

(56) References Cited

U.S. PATENT DOCUMENTS

| | | | |
|---|---|---|---|
| 7,047,241 B1 * | 5/2006 | Erickson ........................ 707/9 |
| 2002/0040435 A1 | 4/2002 | Hamada et al. | |
| 2002/0114466 A1 * | 8/2002 | Tanaka et al. ................ 380/232 |
| 2003/0125976 A1 | 7/2003 | Nguyen et al. | |
| 2003/0154387 A1 * | 8/2003 | Evans et al. .................. 713/193 |

FOREIGN PATENT DOCUMENTS

| JP | 2002-203119 | 7/2002 |
|---|---|---|
| JP | 2005353196 A * | 12/2005 |

OTHER PUBLICATIONS

"Information technology—Multimedia framework (MPEG-21)—Part 5: Rights Expression Language", ISO/IEC 21000-5, First edition, Apr. 1, 2004, pp. 1-121.
"Information technology—Multimedia framework (MPEG-21)—Part 2: Digital Item Declaration", ISO/IEC 21000-2, First edition, Mar. 15, 2003, 70 Pages.

* cited by examiner

*Primary Examiner*—Pierre E Elisca
(74) *Attorney, Agent, or Firm*—Oblon, Spivak, McClelland, Maier & Neustadt, P.C.

(57) ABSTRACT

An apparatus for rendering a digital content having license information defining specifics of permission of a rendering operation includes a license processor that acquires, from the license information of the digital content, a constraint defining conditions for rendering between the digital content and other digital content; an operation execution command generator that generates an operation execution command for rendering the digital content according to the constraint acquired by the license processor; and a content renderer that renders the digital content based on the operation execution command generated by the operation execution command generator.

2 Claims, 31 Drawing Sheets

FIG.2

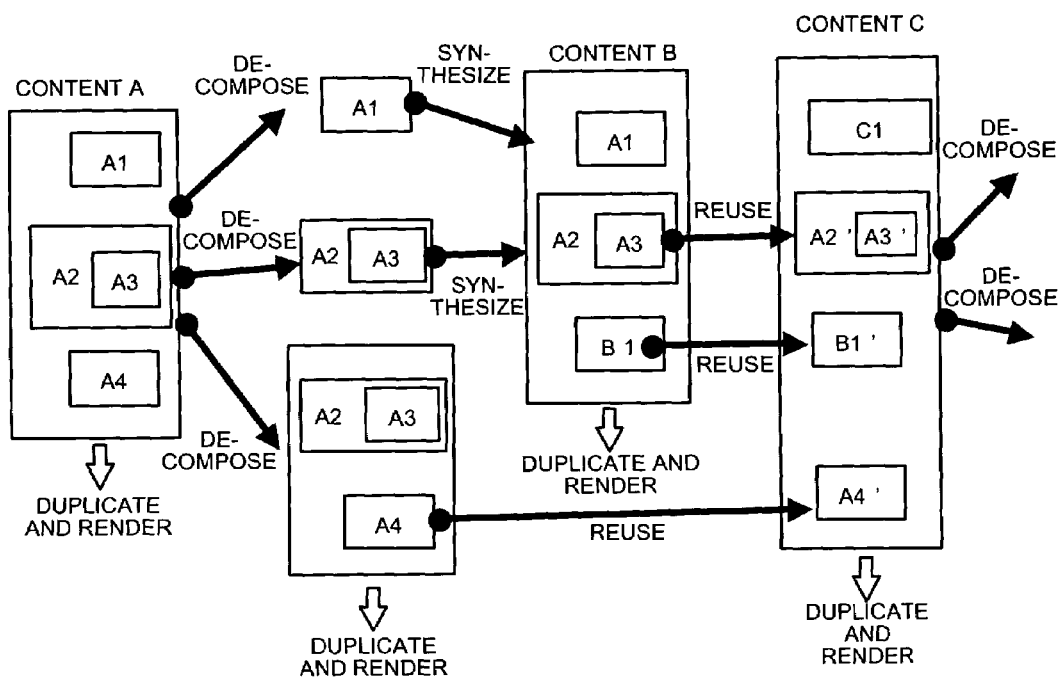

FIG.3A

```
<!---CONSTRAINED PERMIT OPERATION-->
<xs:element name="playWithConstraint" type="PlayWithConstraint"
substitutionGroup="r:right"/>

<xs:complexType name="PlayWithConstraint">
    <xs:complexContent>
        <xs:extensionbase="r:Right">
            <xs:sequence>
                <!--COMPLEMENTARY CONSTRAINT-->
                <xs:element ref="complemantaryConstraint"minOccurs="0"/>
                    <!--EXCLUSIVE CONSTRAINT-->
                <xs:element ref="exclusiveConstraint"minOccurs="0"/>
            </xs:sequence>
        </xs:extension>
    </xs:complexContent>
</xs:complexType>
```

FIG.3B

```
<!--COMPLEMENTARY CONSTRAIN-->                                           ⌐321
<xs:element name="complemantaryConstraint" type="ComplemantaryConstraint"
substitutionGroup="r:licensePart"/>
<xs:complexType name="ComplemantaryConstraint">
    <xs:complexContent>
        <xs:extension base="r:LicensePart">
            <xs:sequence>                    ⌐322
                <xs:element ref="r:resource"/>
                                                                  ⌐323
            <xs:sequece>
                <xs:element name="timeConstraint" minOccurs="0" >
                    <xs:simpleType>
                        <xs:restriction base="xs:string">
                            <xs:enumeration value="synchronous"/>
                            <xs:enumeration value="after"/>
                            <xs:enumeration value="before"/>
                        </xs:restriction>
                    </xs:simpleType>
                </xs:element>
                <xs:choice>
                    <xs:element name="spacialConstraint">          ⌐324
                        <xs:simpleType>
                            <xs:restriction base="xs:string">
                                <xs:enumeration value="above"/>
                                <xs:enumeration value="below"/>
                                <xs:enumeration value="rightSide"/>
                                <xs:enumeration value="leftSide"/>
                                <xs:enumeration value="backward"/>
                                <xs:enumeration value="forward"/>
                                <xs:enumeration value="anywhere"/>
                                <xs:enumeration value="predefined stylesheet"/>
                            </xs:restriction>
                        </xs:simpleType>
                    </xs:element>
                    <xs:element name="structuralConstraint">       ⌐325
                        <xs:simpleType>
                            <xs:restriction base="xs:string">
                                <xs:enumeration value="isContained"/>
                                <xs:enumeration value="isPartOf"/>
                            </xs:restriction>
                        </xs:simpleType>
                    </xs:element>
                </xs:choice>
            </xs:sequece>
            </xs:sequence>
        </xs:extension>
    </xs:complexContent>
</xs:complexType>
```

FIG.3C

```
                                                                  ╭331
┌─────────────────────────────────────────────────────────────────────┐
│<!--EXCLUSIVE CONSTRAINT-->                                          │
│  <xs:element name="exclusiveConstraint" type="ExclusiveConstraint"  │
│substitutionGroup="r:licensePart"/>                                  │
│  <xs:complexType name="ExclusiveConstraint">                        │
│    <xs:complexContent>                                              │
│      <xs:extensionbase="r:LicensePart">                             │
│        <xs:sequence>                                 ╭332           │
│         ┌─────────────────────────────────────────┐                 │
│         │ <xs:element ref="r:resource"/>          │                 │
│         └─────────────────────────────────────────┘                 │
│          <xs:choice>                                                │
│         ┌───────────────────────────────────────────┬─333           │
│         │ <xs:elementname="exclusiveConstraint">    │                │
│         │   <xs:simpleType>                         │                │
│         │     <xs:restriction base="xs:string">     │                │
│         │       <xs:enumeration value="exclusive"/> │                │
│         │     </xs:restriction>                     │                │
│         │   </xs:simpleType>                        │                │
│         │ </xs:element>                             │                │
│         └───────────────────────────────────────────┘                │
│          </xs:choice>                                               │
│        </xs:sequence>                                               │
│      </xs:extension>                                                │
│    </xs:complexContent>                                             │
│  </xs:complexType>                                                  │
└─────────────────────────────────────────────────────────────────────┘
```

FIG.5A

```
                                                                    ,511
┌─────────────────────────────────────────────────────────────────┐
│ <?xml version="1.0" encoding="UTF-8"?>                          │
│ <didl:DIDL>                                                     │
│     <didl:Item id="ContentA">                                   │
│         <didl:Descriptor>                                       │
│             <didl:Statement mimeType="text/xml">  ,512          │
│                 ┌─────────────────────────────────┐             │
│                 │ <r:license licenseId="L-ContentA">│           │
│                 │            :                    │             │
│                 │ </r:license>                    │             │
│                 └─────────────────────────────────┘             │
│             </didl:Statement>                                   │
│         </didl:Descriptor>                                      │
│         <didl:Component>                                        │
│             <didl:Resource ref="novel001.rtx" mimeType="text/richtext"/> │
│         </didl:Component>                                       │
│     </didl:Item>                                                │
│ </didl:DIDL>                                                    │
└─────────────────────────────────────────────────────────────────┘
```

FIG.5B

```
                                                                    ,521
┌─────────────────────────────────────────────────────────────────┐
│ <?xml version="1.0" encoding="UTF-8"?>                          │
│ <didl:DIDL>                                                     │
│     <didl:Item id="ContentB">                                   │
│         <didl:Descriptor>                                       │
│             <didl:Statement mimeType="text/xml">  ,522          │
│                 ┌─────────────────────────────────┐             │
│                 │ <r:license licenseId="L-contentB">│           │
│                 │            :                    │             │
│                 │ </r:license>                    │             │
│                 └─────────────────────────────────┘             │
│             </didl:Statement>                                   │
│         </didl:Descriptor>                                      │
│         <didl:Component>                                        │
│             <didl:Resource ref="illustI001.jpg" mimeType="image/jpeg"/> │
│         </didl:Component>                                       │
│     </didl:Item>                                                │
│ </didl:DIDL>                                                    │
└─────────────────────────────────────────────────────────────────┘
```

FIG.5C

```
<?xml version="1.0" encoding="UTF-8"?>
<didl:DIDL>
    <didl:Item id="ContentC">
        <didl:Descriptor>
            <didl:Statement mimeType="text/xml">
                <r:license licensetID="L-contentC">
                    :
                </r:license>
            </didl:Statement>
        </didl:Descriptor>
        <didl:Component>
            <didl:Resource ref="illustI002.jpg" mimeType="image/jpeg"/>
        </didl:Component>
    </didl:Item>
</didl:DIDL>
```

FIG.6A

```
<?xml version="1.0" encoding="UTF-8"?>
<!--=LICENSE INFORMATION OF CONTENT A=-->
<r:license licensetID="L-contentA">
    <!--========= RENDERING LICENSE =========-->
    <r:grant>
        <!--= USE RIGHT HOLDER =-->
        <r:keyHolder/>
        <!--= PERMIT OPERATION =-->
        <mx:play/>
        <!--= USE CONDITION =-->
        <r:validityInterval>
            <r:notBeforer> 2004-01-01T00:00:00</r:notBeforer>
            <r:notAfter>2054-12-31T12:59:59</r:notAfter>
        </r:validityInterval>
    </r:grant>
</r:license>
```

FIG.6B

```
                                                                    ⎡621
┌─────────────────────────────────────────────────────────────┐
│ <? xml version="1.0" encoding="UTF-8"?>                      │
│ <!--= LICENSE INFORMATION OF CONTENT B =-->                  │
│ <r:license licensetID="L-contentB">                          │
│      <!--========  RENDERING LICENSE  ==========-->          │
│      <r:grant>                                               │
│          <!--= USE RIGHT HOLDER =-->                         │
│          <r:keyHolder/>                  ⎡622                │
│         ┌────────────────────────────────────────────┐      │
│         │ <!--=PERMIT OPERATION=-->                   │      │
│         │ <playWithConstraint>             ⎡623      │      │
│         │    ┌──────────────────────────────────┐    │      │
│         │    │ <complemantaryConstraint >       │    │      │
│         │    │    <r:digitalReference>          │    │      │
│         │    │       <r:nonSecureIndirect id="ContentA"/> │ │
│         │    │    </r:digitalReference>         │    │      │
│         │    │    <timeConstraint>synchronous</timeConstraint> │
│         │    │    <spacialConstraint>backward</spacialConstraint> │
│         │    ├──────────────────────────────────┤─624│      │
│         │    │ </complemantaryConstraint >      │    │      │
│         │    │ < exclusiveConstraint>           │    │      │
│         │    │    <r:digitalReference>          │    │      │
│         │    │       <r:nonSecureIndirect id="ContetnC"/> │  │
│         │    │    </r:digitalReference>         │    │      │
│         │    │    <generalConstraint>exclusive</generalConstraint> │
│         │    └──────────────────────────────────┘    │      │
│         │    </exclusiveConstraint>                  │      │
│         │ </playWithConstraint>                      │      │
│         └────────────────────────────────────────────┘      │
│          <!--= USE CONDITION =-->                            │
│          <r:validityInterval>                                │
│              <r:notBeforer> 2004-01-01T00:00:00</r:notBeforer>│
│              <r:notAfter>2004-12-31T12:59:59</r:notAfter>    │
│          </r:validityInterval>                               │
│      </r:grant>                                              │
│ </r:license>                                                 │
│                                                              │
└─────────────────────────────────────────────────────────────┘
```

FIG.6C

```
                                                                    631
<?xml version="1.0" encoding="UTF-8"?>
<!--=LICENSE INFORMATION OF CONTENT C=-->
<r:license licensetID="L-contentC">
    <!--========== RENDERING LICENSE ==========-->
    <r:grant>
        <!--= USE RIGHT HOLDER =-->
        <r:keyHolder/>                                              632
        <!--= PERMIT OPERATION =-->
        <playWithConstraint>                                        633
            <exclusiveConstraint>
                <r:digitalReference>
                    <r:nonSecureIndirect id="ContentB"/>
                </r:digitalReference>
                <generalConstraint>exclusive</generalConstraint>
            </exclusiveConstraint>
        </playWithConstraint>
        <!--= USE CONDITION =-->
        <r:validityInterval>
            <r:notBeforer> 2004-01-01T00:00:00</r:notBeforer>
            <r:notAfter>2004-12-31T12:59:59</r:notAfter>
        </r:validityInterval>
    </r:grant>
</r:license>
```

| OPERATION | OPPOSITE OPERATION |
|---|---|
| above | below |
| below | above |
| rightSide | leftSide |
| leftSide | rightSide |
| foreward | backward |
| backward | foreward |
| after | before |
| before | after |
| isContained | isPartOf |
| isPartOf | isContained |

| Right | ID1 | ID2 | Op - Type | Existence Check |
|---|---|---|---|---|
| playWithConstraint | A | B | below | false |
| playWithConstraint | A | B | after | false |
| playWithConstraint | B | C | synchronous | false |
| playWithConstraint | C | D | exclusive | false |
| play | D | nil | nil | false |

FIG.24A

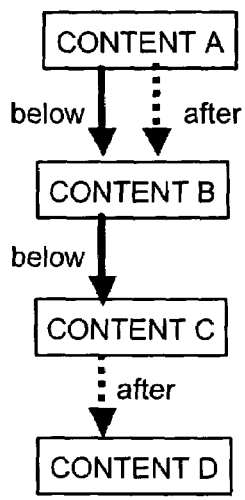

FIG.24B

OPERATION TABLE 111

| Right | ID1 | ID2 | op-type | Existence Check |
|---|---|---|---|---|
| playWithConstraint | A | B | below | |
| playWithConstraint | A | B | after | |
| playWithConstraint | B | C | below | |
| playWithConstraint | C | D | after | |
| play | D | nil | nil | |

FIG.24C

TIME CONSTRAINT
TABLE GENERATION

| | TCT |
|---|---|
| 1 | (B) (A) |
| 2 | (D) (C) |

SPATIAL CONSTRAINT
TABLE GENERATION

| | SCT |
|---|---|
| 1 | (A below B) |
| 2 | (B below C) |
| 3 | (D) |

CONDITION TABLE
MERGING PROCESS 112

| | TCT |
|---|---|
| 1 | (C) (B below C) (A below B) |
| 2 | (D) (C) |

FIG.24F

EXECUTION SEQUENCE
GENERATING PROCESS 112

| | TCT |
|---|---|
| 1 | (D) (C) (B below C) (A below B) |

FIG. 25A

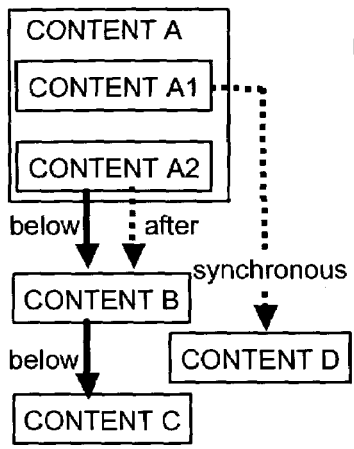

FIG. 25B

OPERATION TABLE ⟨111

| Right | ID1 | ID2 | op-type | Existence Check |
|---|---|---|---|---|
| playWithConstraint | A1 | D | synchronous | |
| playWithConstraint | A2 | B | below | |
| playWithConstraint | A2 | B | after | |
| playWithConstraint | B | C | below | |
| play | D | nil | nil | |
| play | C | nil | nil | |

FIG. 25C

TIME CONSTRAINT TABLE GENERATION

| | TCT |
|---|---|
| 1 | (A1 D &) |
| 2 | (B) (A2) |

SPATIAL CONSTRAINT TABLE GENERATION

| | SCT |
|---|---|
| 1 | (A2 below B) |
| 2 | (B below C) |
| 3 | (D) |
| 4 | (C) |

CONDITION TABLE MERGING PROCESS ⟨112

| | TCT |
|---|---|
| 1 | (A1 D &) |
| 2 | (C) (B below C) (A2 below B) |

FIG. 25F

EXECUTION SEQUENCE GENERATING PROCESS ⟨112

| | TCT |
|---|---|
| 1 | (A1 D &) |
| 2 | (C) (B below C) (A2 below B) |

FIG.26A

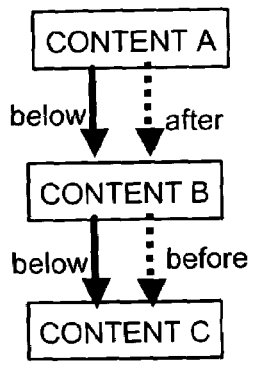

FIG.26B

OPERATION TABLE  111

| Right | ID1 | ID2 | op-type | Existence Check |
|---|---|---|---|---|
| playWithConstraint | A | B | below | |
| playWithConstraint | A | B | after | |
| playWithConstraint | B | C | below | |
| playWithConstraint | B | C | before | |
| play | C | nil | nil | |

FIG.26C

TIME CONSTRAINT
TABLE GENERATION

| | TCT |
|---|---|
| 1 | (B) (A) |
| 2 | (B) (C) |

SPATIAL CONSTRAINT
TABLE GENERATION

| | SCT |
|---|---|
| 1 | (A below B) |
| 2 | (B below C) |
| 3 | (C) |

CONDITION TABLE
MERGING PROCESS  112

| | TCT |
|---|---|
| 1 | (B below C) (A below B) |
| 2 | (B below C) (C) |

FIG.26F

EXECUTION SEQUENCE
GENERATING PROCESS  112

| | TCT |
|---|---|
| 1 | (B) (A below B) (C above B) |

FIG.27A

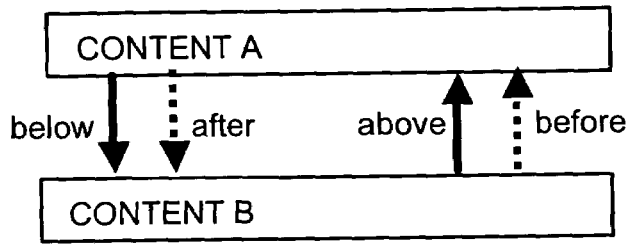

FIG.27B

OPERATION TABLE 111

| Right | ID1 | ID2 | op-type | Existence Check |
|---|---|---|---|---|
| playWithConstraint | A | B | below | |
| playWithConstraint | A | B | after | |
| playWithConstraint | B | A | above | |
| playWithConstraint | B | A | before | |

FIG.27C

TIME CONSTRAINT
TABLE GENERATION

| | TCT |
|---|---|
| 1 | (B) (A) | 112

FIG.27D

SPATIAL CONSTRAINT
TABLE GENERATION

| | SCT |
|---|---|
| 1 | (A below B) | 113

FIG.27E

CONDITION TABLE
MERGING PROCESS 112

| | TCT |
|---|---|
| 1 | (B) (A below B) |

FIG.27F

EXECUTION SEQUENCE
GENERATING PROCESS 112

| | TCT |
|---|---|
| 1 | (B) (A below B) | ial # APPARATUS AND METHOD FOR RENDERING DIGITAL CONTENT

CROSS-REFERENCE TO RELATED APPLICATIONS

This application is based upon and claims the benefit of priority from the prior Japanese Patent Application No. 2004-287627 filed on Sep. 30, 2004 the entire contents of which are incorporated herein by reference.

BACKGROUND OF THE INVENTION

1) Field of the Invention

This invention relates to a digital content rendering apparatus, a digital content rendering method for rendering a digital content based on the license information defining the specifics of permission of the rendering operation.

2) Description of the Related Art

In recent years, a multiplicity of DRMs (Digital Right Managements) providing a technique for protecting the copyright of a digital work have been developed. Especially, the commercial digital contents for movies and music, as represented by DVD, have been developed with the copyright strongly protected in a form advantageous to the contents provider.

The function of these techniques to protect the copyright is provided as a very rigid and stubborn mechanism in the presence of a strong desire to prevent the duplication of digital contents, and limits the freedom of the user more than analog contents.

The copyright law lays downs a provision of what is called the fair use whereby a work can be used without permission of the copyright holder by duplication or citation for private use. As to digital works, however, the freedom of the user is limited to prevent the duplication as described above, and therefore the duplication or citation for private use is prohibited. In view of this, the desire has increased for the fair use of digital works.

On the other hand, the copyright protection of non-commercial contents such as business documents, product catalogs, personal home pages, electronic mails, or the like with the contents thereof routinely reused and secondarily processed currently draws less attention, and therefore these contents have yet to be safely distributed.

In this situation, the activities are being carded out for international standardization such as ISO/IEC 21000 (MPEG21) aimed at the distribution and management of various forms of digital contents. With regard to MPEG21, a digital item declaration language (DIDL) for expressing the composite content configured of a combination and connection of a plurality of contents has been standardized, whereby the composite content including a plurality of contents as component elements has become possible to handle. Further, a right expression language (REL) making possible flexible license description has also been standardized, and a supporting method for describing the license using REL has been proposed by USP Application Pub. No. US2003/0125976.

A technique for synthesizing a CM image and a video content and rendering a composite content using the information such as the age, sex, distribution history and purchase history of the user of the content has been proposed in Japanese Patent Application Laid-Open No. 2002-203119.

When the distribution and reuse of a composite content is intended, however, the assumption is required that the elements constituting the particular composite content are distributed and reused as individual contents or synthesized with other different contents for rendering. In such a case, the context information including the position as viewed from the whole or the relationship with other component elements is liable to be lost by the individual use of the component elements. As a result, the original intention of the author may be expressed erroneously or transmitted as insignificant information.

It may be considered that this inconvenience can be avoided by integrating the component elements indivisibly. Each component element, however, may be a complete work itself and not necessarily require other component elements. From the viewpoint of distribution of digital contents that can be readily reused, the process of integrating the component elements indivisibly leads to an increased cost of editing and right handling and rather constitutes a stumbling block to the sound redistribution of contents.

MPEG21/DIDL has a mechanism for expressing the structural information of the composite content while at the same time selecting the component elements to be rendered and excluding the other component elements at the time of rendering. When the composite content is distributed by division, the original structure cannot be restored. According to the technique of USP Application Pub. No. US2003/0125976 using MPEG21/REL, the use license can be set for each component element of the composite content, but the license description including the correlation between the contents is impossible.

In the technique described in Patent Application Laid-Open No. 2002-203119, the contents are individually synthesized based on the user information. This is not a mechanism for protecting the intention of the author, and once it is decomposed again and the component elements are distributed, the original structure cannot be restored.

SUMMARY OF THE INVENTION

It is an object of the present invention to at least solve the problems in the conventional technology.

An apparatus for rendering a digital content having license information defining specifics of permission of a rendering operation according to one aspect of the present invention includes a license processor that acquires, from the license information of the digital content, a constraint defining conditions for rendering between the digital content and other digital content; an operation execution command generator that generates an operation execution command for rendering the digital content according to the constraint acquired by the license processor; and a content renderer that renders the digital content based on the operation execution command generated by the operation execution command generator.

A method of rendering a digital content having license information defining specifics of permission of a rendering operation according to another aspect of the present invention includes acquiring, from the license information of the digital content, a constraint defining conditions for rendering between the digital content and other digital content; generating an operation execution command for rendering the digital content according to the constraint; and rendering the digital content based on the operation execution command.

The computer program product according to still another aspect of the present invention causes a computer to perform the method according to the present invention.

The other objects, features, and advantages of the present invention are specifically set forth in or will become apparent from the following detailed description of the invention when read in, conjunction with the accompanying drawings.

BRIEF DESCRIPTION OF THE DRAWINGS

FIG. 2 is a diagram that explains the distribution image of the composite content;

FIG. 3A is a diagram that explains the description model of a constrained operation;

FIG. 3B is a diagram that explains the description model of a complementary constraint;

FIG. 3C is a diagram that explains the description model of an exclusive constraint;

FIG. 5A is a schematic diagram that depicts an example of the content data described in MPEG21 form;

FIG. 5B is a schematic diagram that depicts an example of the content data described in MPEG21 form;

FIG. 5C is a schematic diagram that depicts an example of the content data described in MPEG21 form;

FIG. 6A is a schematic diagram that depicts an example of the license data described in XML form;

FIG. 6B is a schematic diagram that depicts an example of the license data described in XML form;

FIG. 6C is a schematic diagram that depicts an example of the license data described in XML form;

FIG. 7 is a diagram that explains an example of the constraint relationship dictionary;

FIG. 24 is a schematic diagram that depicts an example of content rendering in the digital content rendering apparatus according to this embodiment;

FIG. 25 is a schematic diagram that depicts an example of content rendering in the digital content rendering apparatus according to this embodiment;

FIG. 26 is a schematic diagram that depicts an example of content rendering in the digital content rendering apparatus according to this embodiment;

FIG. 27 is a schematic diagram that depicts an example of content rendering in the digital content rendering apparatus according to this embodiment.

DETAILED DESCRIPTION

With reference to the accompanying drawings, a digital content rendering apparatus, a digital content rendering method, a digital content rendering program and a recording medium for recording the digital content rendering program according to a preferred embodiment of the invention are described in detail below.

The digital content rendering apparatus according to this embodiment is adapted to acquire the constraint described in the license information of the content and render the digital content in such a manner as to satisfy the constraint thus acquired.

Figure 1:
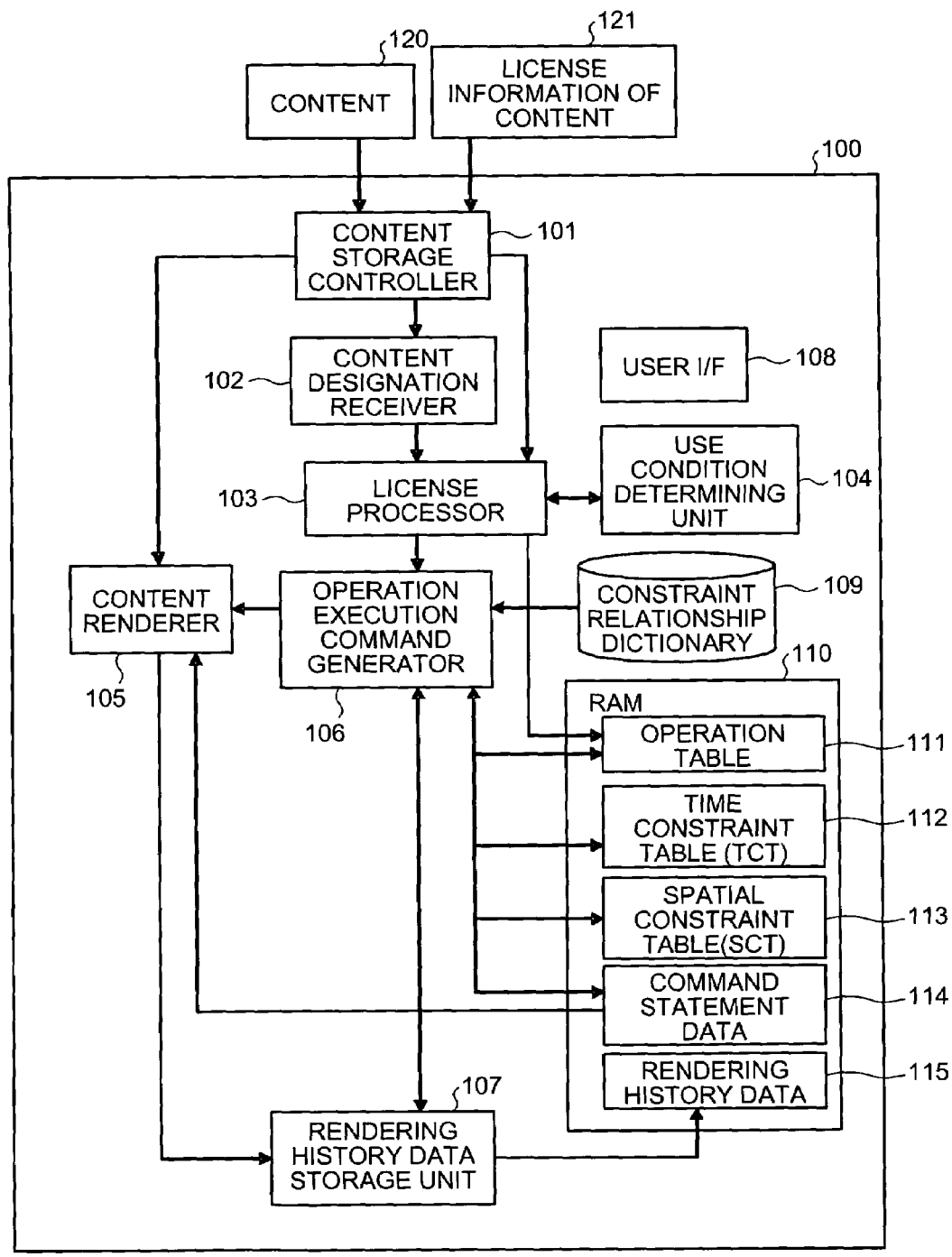
FIG. 1 is a block diagram that depicts a configuration of the digital content rendering apparatus according to an embodiment.

FIG. 1 is a block diagram that depicts the configuration of a digital content rendering apparatus 100 according to this embodiment As shown in FIG. 1, the digital content rendering apparatus 100 comprises a content storage controller 101, a content designation receiver 102, a license processor 103, a use condition determining unit 104, a content renderer 105, an operation execution command generator 106, a rendering history data storage unit 107 and a user I/F 108. Also, the digital content rendering apparatus 100 according to this embodiment holds a constraint relationship dictionary 109 in a hard disk drive (HDD). Further, the digital content rendering apparatus 100 holds an operation table 111, a time constraint table (TCT) 112, a spatial constraint table (SCT) 113, command statement data 114 and rendering history data 115 in a RAM (random access memory) 110.

In the digital content rendering apparatus 100 according to this embodiment, an operatively interlocked relationship is assured between the content storage controller 101 that reads the content 120 and the license information 121 of the content, the content designation receiver 102 that receives the content designated for rendering by the user from the content read, the license processor 103 that acquires the use conditions and the constraint from the license information 121 of the content 120 that has received the designation for rendering and generates an operation execution command and renders the content according to the use conditions and the constraint, the use condition determining unit 104, the content renderer 105, the operation execution command generator 106 and the rendering history data storage unit 107. The detailed structure of the license information 121 of the content is explained in detail later.

The content storage controller 101 reads the content 120 designated by the user and the license information 121 of the content from the user VF 108, and stores them in the storage unit such as a RAM 110 in the digital content rendering apparatus 100.

The content designation receiver 102 displays a list of the contents stored in the content storage controller 101 on the user I/F 108, and receives the content designated by the user from the contents displayed.

The license processor 103 acquires the use conditions and the constraint from the license information 121 of the content corresponding to the content ID received from the content designation receiver 102, determines the constraint and whether the use conditions for rendering are satisfied and prepares the operation table 111. The content ID is defined as information for uniquely identifying the content The detailed structure of the operation table 111 is explained later.

The use condition determining unit 104 determines from the use conditions described in the license information 121 of the content whether the content can be rendered.

The operation execution command generator 106 receives the operation table 111 prepared by the license processor 103, and while accessing to the information on the content stored in the rendering history data 115 and being rendered and the relationship between the constraints held in the constraint relationship dictionary 109, generates an operation execution command that satisfies the constraints stored in the operation table 111 received.

The rendering history data storage unit 107 holds the rendering history data 115. The rendering history data 115 holds the content ID of the content being rendered.

The content renderer 105 reads the required content from the storage unit in which it is stored by the content storage controller 101, based on the operation execution command generated by the operation execution command generator 106, and renders the content thus read.

The user I/F 108, including a display unit such as a display and an input device such as a keyboard or a mouse, displays a screen for selecting the content or a screen (not shown) for rendering the content, while at the same time receiving the input operation from these screens.

The constraint relationship dictionary 109 is a data file storing the relationship between the constraints, and contains the definition of the constraint contrary to a given constraint as a relationship between the constraints. The detailed structure of the constraint relationship dictionary 109 is described later.

The RAM 110 is a memory capable of random access, and functions as a storage unit that stores the operation table 111, the TCT 112, the SCT 113, the command statement data 114 and the rendering history data 115.

The operation table 111 stores the operation permitted for rendering of each content making up a component element of the composite content and the type of a constraint that may exist The detailed structure of the operation table 111 is described later.

The TCT 112 stores the result of extracting the time constraint, which is one of the constraints, from the operation table 111 on the one hand and stores the result of merging the stored time constraint with a spatial constraint, which is another one of the constraints, on the other hand. The TCT 112 is further used for storing the execution sequence generated from the merged constraints. The detail of the time constraint and the spatial constraint and the detailed structure of the TCT 112 are described later.

The SCT 113 stores the result of extracting the spatial constraint, which is one of the constraints, from the operation table 111. The detail of the spatial constraint and the detailed structure of the SCT 113 are described later.

The command statement data 114 stores the command statement for executing the content rendering, which text is generated by converting the execution sequence stored in the TCT 112. The detailed structure of the command statement data is described later.

FIG. 2 is a schematic diagram that depicts the manner in which the elements making up the composite content are distributed and reused individually as units. In the case shown in FIG. 2, the content A is decomposed into the component elements including the contents A1 to A4. Of these contents, the contents A1 to A3 are synthesized with another content B1 to generate a content B. Also, the contents A2, A3, B1 making up the component elements of the content B and the content A4 making up the component element of the content A are reused and synthesized with another content C1 to generate a content C.

When the context information including the position as viewed from the content A as a whole and the relationship with other elements is defined between the contents A1 and A4 making up the component elements of the content A in the case shown in FIG. 2, the digital content rendering apparatus 100 according to this embodiment can render the contents B and C while protecting the particular context information.

In FIG. 3A, the definition of the constraint is expressed in the form of XML Schema. According to this embodiment, the constraint 311 is based on REL of MPEG21 and defined in the form of an extension of REL of MPEG21. Specifically, as shown in FIG. 3A, the permit operation "playWithConstraint" is defined as an extension of the "Right" (permit operation) element in REL of MPEG21 in such a manner as to designate one or both of the two constraints including the complementary constraint 312 and the exclusive constraint 313. In this way, the permit operation extended to attach a constraint to the permit operation ("Right") in REL of MPEG21 corresponds to the constraint according to the invention.

The complementation and the exclusion are not generally established interactively, but only in one direction. When the constraint is designated interactively, the complementary constraint or the exclusive constraint is required to be defined mutually.

In this embodiment, the constraint is indicated in the form of XML. Alternatively, however, the constraint may be expressed in the format of table, relational data base or semantic network.

FIG. 3B shows the definition of the complementary constraint 312 in FIG. 3A in the form of XML Schema. The complementary constraint is to forcibly recover a constraint content subjected to the constraint at the same time as the main content, when rendering the main content subjected to the constraint. The complementary constraint 321 is expressed by the constraint content 322 and the constraint type as a pair. The constraint type designates one or both of the time constraint type 323 and the spatial constraint type 324 or one or both of the time constraint type 323 and the structural constraint type 325.

Specifically, although the time constraint type 323 and other constraints can be designated at the same time, the spatial constraint type 324 and the structural constraint type 325 cannot be designated at the same time. According to this embodiment, the designation of the spatial constraint is explained. Also when the structural constraint is designated, however, the digital contents can be rendered in such a manner as to satisfy the constraints by the same procedure as when the spatial constraint is designated.

As for the time constraint type 323, one of (1) "synchronous" (the main content and the constraint content are rendered synchronously), (2) "after" (the main content is rendered after the constraint content), and (3) "before" (the main content is rendered before the constraint content).

As for the spatial constraint type 324, on the other hand, one of the types can be designated, including (1) "above" (the main content is arranged above the constraint content), (2) "below" (the main content is arranged below the constraint content), (3) "rightSide" (the main content is arranged on the right side of the constraint content), (4) "leftSide" (the main content is arranged on the left side of the constraint content), (5) "backward" (the main content is arranged behind the constraint content), (6) "forward" (the main content is arranged in front of the constraint content), (7) "anywhere" (the main content is arranged at any place), and (8) "predefined stylesheet" (the main content is arranged based on the data containing the description of arrangement).

As for the structural constraint type 325, any one of (1) "isContained" (a constraint content is included as an element of the main content) and (2) "isPartOf" (the main content is included as an element of the constraint content) can be designated.

The constraint type is not limited to those described above, but may be further extended. Some content types can be configured such that a specific constraint type cannot be defined. When the contents constrained by each other are both still images, for example, the time concept is not applicable and therefore a configuration may be employed in which the time constraint type cannot be set. Also, when the contents constrained by each other are both audio contents, on the other hand, the spatial concept is not applicable, and therefore a configuration may be employed in which the spatial constraint type cannot be set In such a case, the constraint type such as MimeType that can be set based on the characteristic of the content can be limited.

FIG. 3C shows the definition of the exclusive constraint 313 in FIG. 3A is expressed in the form of XML Schema. The exclusive constraint prohibits the existence of the constraint content when rendering the main content. The exclusive constraint 331 is expressed by the constraint content 332 and, the constraint type as a pair. The exclusive constraint type 333 ("exclusive") can be designated as a constraint type.

Figure 4A:
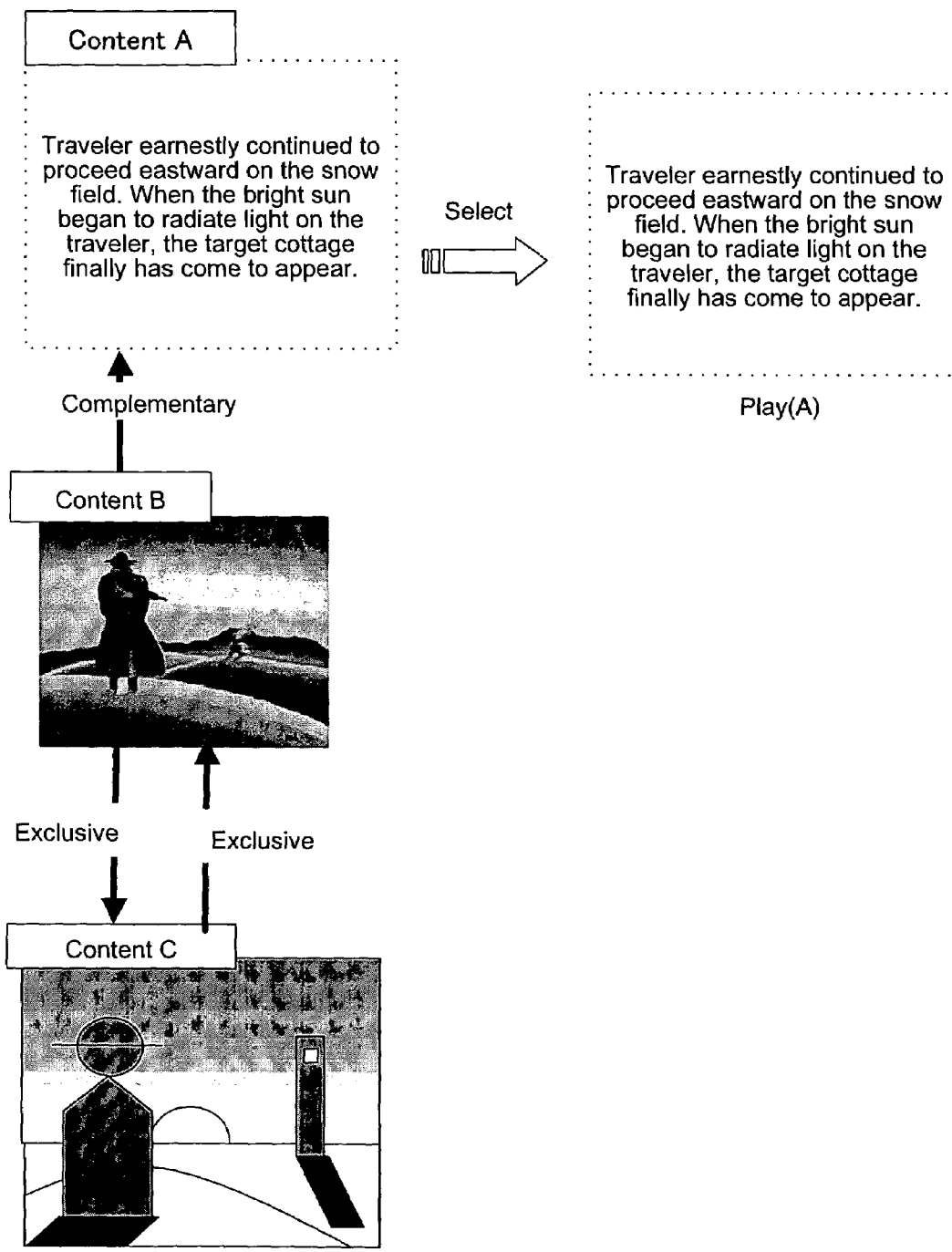
FIG. 4A is a schematic diagram that depicts an example of the rendering image of the composite content having a constraint.
Figure 4B:
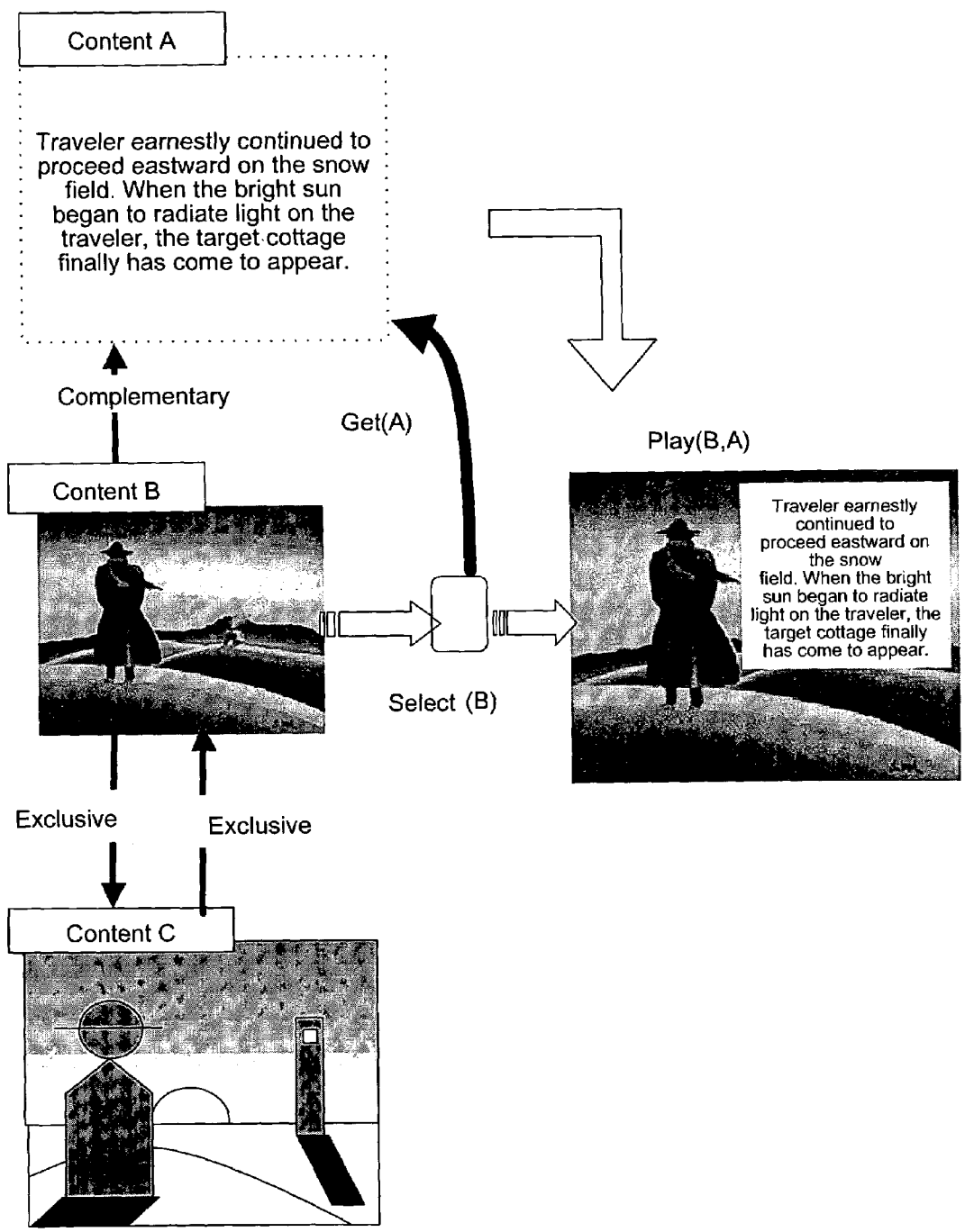
FIG. 4B is a schematic diagram that depicts an example of the rendering image of the composite content having a constraint.
Figure 4C:
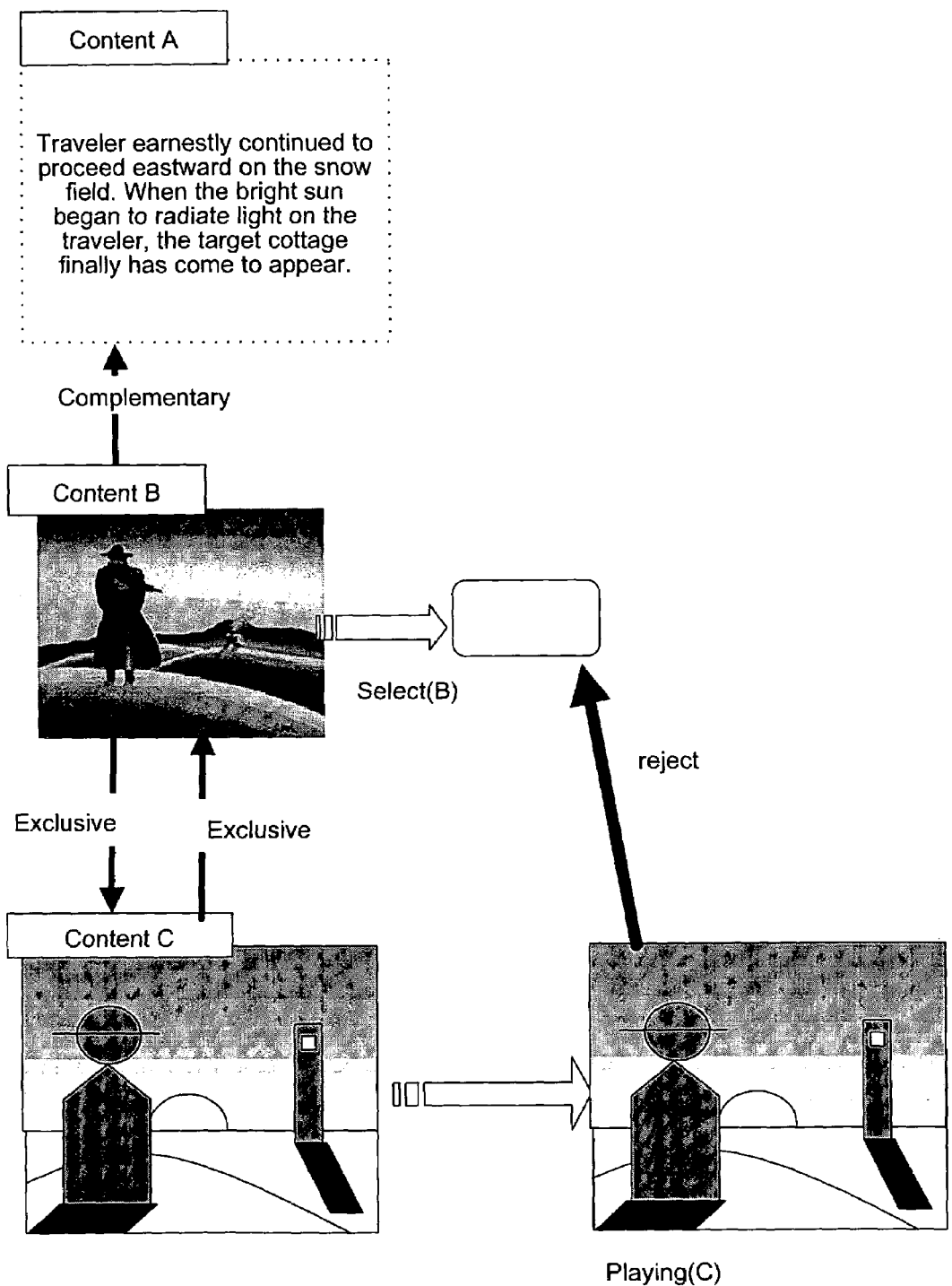
FIG. 4C is a schematic diagram that depicts an example of the rendering image of the composite content having a constraint.

FIGS. 4A to 4C are schematic diagrams that depict an example of rendering the component elements of the composite content with a designated constraint in the digital content rendering apparatus 100 according to this embodiment. In FIGS. 4A to 4C, a complementary constraint is defined from the content B to the content A and an exclusive constraint between the contents B and C.

FIG. 4A shows that only the content A is rendered when the rendering of only the content A is designated under the constraint described above. FIG. 4B shows that the content A is forcibly recovered and rendered at the same time as the content B according to the complementary constraint when the rendering of only the content B is designated under the constraint. FIG. 4C shows that the rendering of the content B is rejected due to the extrusive constraint when the rendering of the content B is designated under the constraint in a situation where the content C is already rendered.

FIG. 5A shows an example of describing the definition of the data of the content A shown in FIGS. 4A to 4C in the form of XML specified by DIDL of MPEG21. The license information 121 of the content A is described in the license information description area 512 contained in the data 511 of the content A.

FIG. 5B shows an example of describing the definition of the data of the content B shown in FIGS. 4A to 4C in the form of XML defined in DIDL of MPEG21. The license information 121 of the content B is described in the license information description area 522 contained in the data 521 of the content B.

FIG. 5C shows an example of describing the definition of the data of the content C shown in FIGS. 4A to 4C in the form of XML defined in DIDL of MPEG21. The license information 121 of the content C is described in the license information description area 532 contained in the data 531 of the content C.

FIGS. 6A to 6C show an example in which the data structure of the license information 121 of the content in FIG. 1 is described in the form extended for description of the constraint based on the form defined by REL of MPEG21. The description (611, 621, 631) of all the grants of permission defines each element of the principal having the right to use, the permit operation ("Right") and the use condition based on REL of MPEG21.

The license information 611 in FIG. 6A shows the detailed description of the license information description area 512 shown in FIG. 5A. The license information 611 has no special description of constraint but the permit operation 612 ("play") for normal rendering.

The license information 621 in FIG. 6B shows the detailed description of the license information description area 522 shown in FIG. 5B. The permit operation 622 includes the description of two constraints (623, 624) as constraints between the contents, which represent the extension of the current REL of MPEG21. The constraint 623 includes two complementary constraints, namely the time constraint ("synchronous") and the spatial constraint ("backward"). The constraint 624, on the other hand, includes the description of the exclusive constraint ("exclusive").

The license information 631 in FIG. 6C shows the detailed description of the license information description area 532 shown in FIG. 5C. The permit operation 632 includes the description of the exclusive constraint 633 ("exclusive") between the contents, and represents an extension of current REL of MPEG21.

FIG. 7 is a diagram that explains an example of the structure of the constraint relationship dictionary 109. As shown in the example in FIG. 7, the constraint relationship dictionary 109 stores the operation opposite to a given operation. As an opposite operation to "above" indicating the operation of arranging the main content above, for example, "below" for arranging the main content below is stored. From the relationship between the constraints stored in the constraint relationship dictionary 109, the substantially same constraint designated between two contents is found out and the double operation is excluded.

Figures 8, 9:
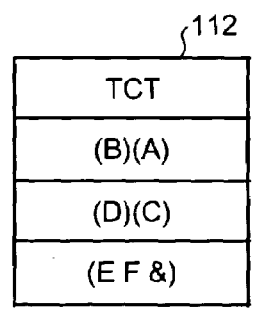
FIG. 8 is a diagram that explains an example of the operation table.
FIG. 9 is a diagram that explains an example of the time constraint table (TCT)

FIG. 8 is a diagram that explains an example of the structure of the operation table 111. As shown by the example in FIG. 8, the operation table 111 stores the permit operation ("Right"), the content ID (ID1) of the main content, the content ID (ID2) of the constraint content, the constraint type ("Op-Type") and a flag ("ExistenceCheck") indicating whether the main content is being rendered.

The permit operation designates the operation permitted when using the content, and stores the specifics of the "Right" (permit operation) element in REL of MPEG21. In the digital content rendering apparatus 100 according to this embodiment, "rendering" defined according to the standard of REL of MPEG21 or "playWithConstraint" defined by extending REL of MPEG21 is set as the permit operation.

The content ID of the constraint content and the constraint type are set only when "playWithConstraint" (the permit operation extended to have a constraint) is set as a permit operation. In other cases, "nil" is set. The constraint type is set as a value defined corresponding to the type of the constraint such as the time constraint, the spatial constraint or the structural constraint.

The flag indicating whether the main content is being rendered is used for the process of suppressing the generation of the operation execution command of the content being rendered for the content being rendered, and set to "true" while in rendering and "false" while not in rendering.

FIG. 9 is a diagram that explains an example of the structure of the time constraint table (TCT) 112. The TCT 112 stores the time constraint for content rendering with the contents IDs arranged from left to right in the order of rendering or with "&" attached after two content IDs of the contents rendered at the same time. As shown in FIG. 9, for example, assume that the content B is rendered before the content A The data "(B)(A)" is stored in the TCT 112. Similarly, when the content D is rendered before the content C, the data "(D)(C)" is stored, and when the content E is rendered at the same time as the content F, the data "(EF&)" is stored in the TCT 112.

Figure 10:
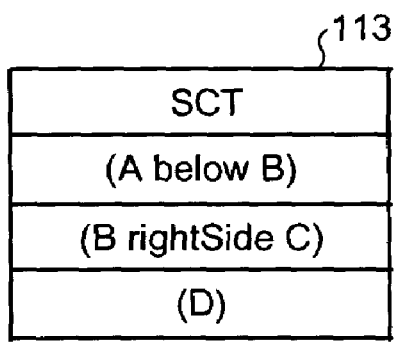
FIG. 10 is a diagram that explains an example of the spatial constraint table (SCT)

FIG. 10 is a diagram that explains an example of the structure of the spatial constraint table (SCT) 113. As shown in FIG. 10, the SCT 113 stores the data with the description of the constraint type between two content IDs when the spatial constraint is designated between the two contents of the two content IDs. When the spatial constraint is not designated, on the other hand, the data with the description of the individual content IDs is stored. When the content A is arranged below the content B for rendering as shown in FIG. 10, for example, the data "(A below B)" is stored in SCT 113. Similarly, when the content B is arranged on the right side of the content C for rendering, the data "(B rightSide C)" is stored in the SCT 113. Also, when the spatial constraint is not designated for the content D, the data "(D)" is stored in the SCT 113.

Figure 11:
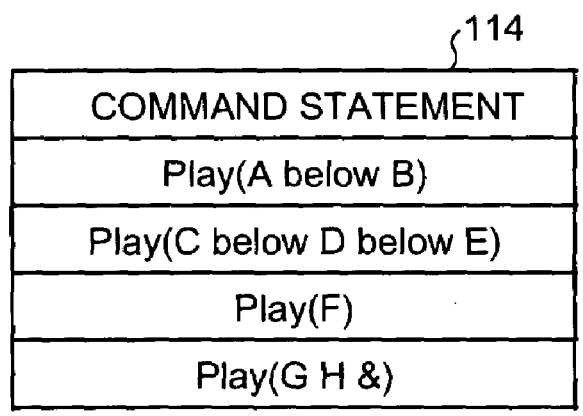
FIG. 11 is a diagram that explains an example of the command statement data.

FIG. 11 is a diagram that explains an example of the structure of the command statement data 114. The command statement data 114 stores rendering commands in the order of rendering according to the execution sequence generated after merging the TCT 112 and the SCT 113 with each other. Specifically, a text with "Play" attached before the execution sequence generated is stored as a command statement When the execution sequence is "(C below D below E)", for example, the data "Play(C below D below E)" is stored in the command statement data 114 as a command statement.

Figure 12:
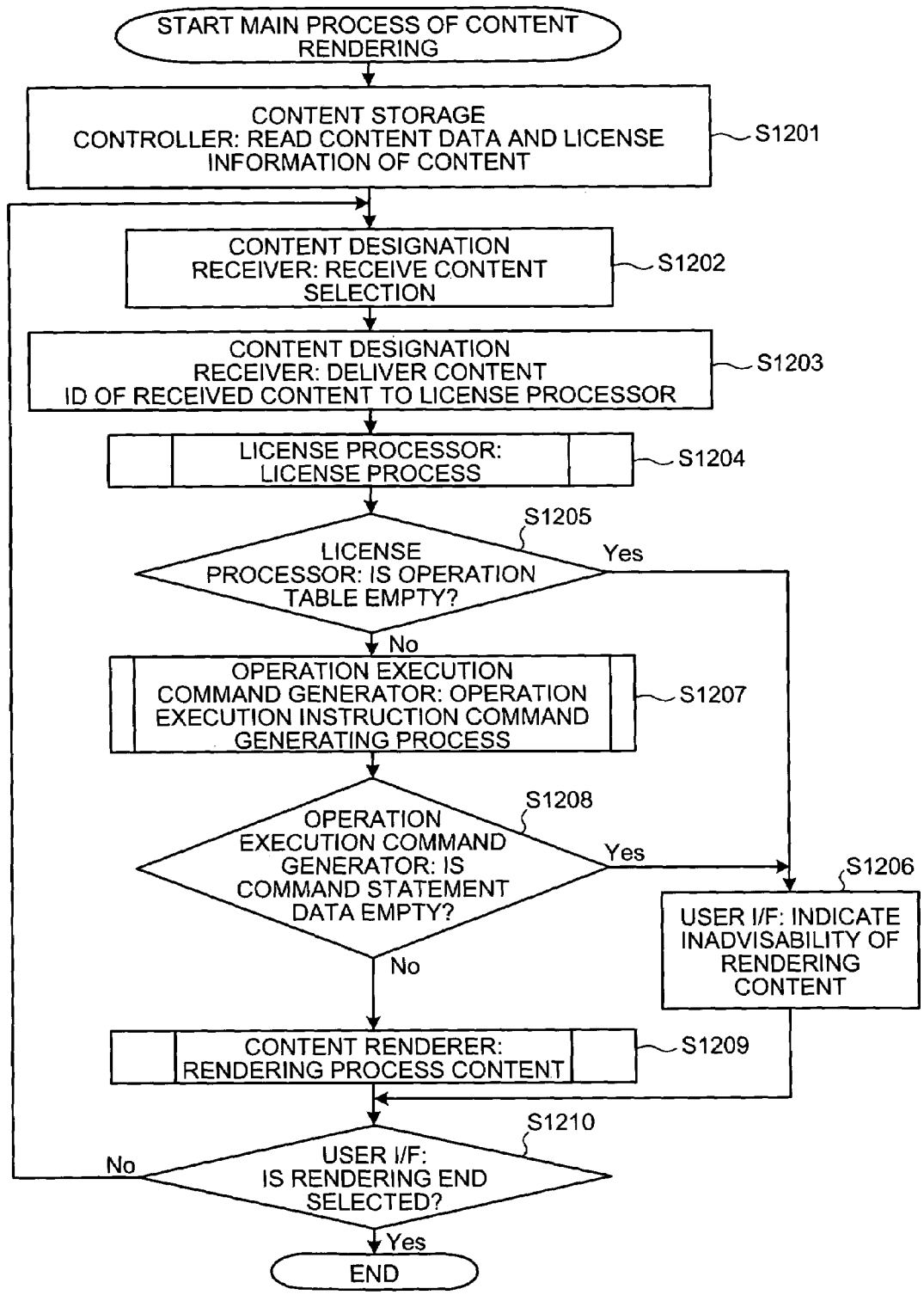
FIG. 12 is a flowchart that depicts the content rendering process in the digital content rendering apparatus according to this embodiment.

The process of rendering the content by the digital content rendering apparatus 100 according to this embodiment configured as described above is explained. FIG. 12 is a flowchart that depicts a general flow of the content rendering process according to this embodiment The content storage controller 101 reads the content data of the content 120 designated by the user for rendering and the license information 121 of the content (step S1201). The content 120 and the license information 121 of the content may be integrated in the same file or stored in different files. Also, the content 120 may be read as a local content from a HDD or the like storage medium or by being downloaded from an external server through a network.

The content which the user wants to render is selected and received from the contents making up the component elements of the content read by the content designation receiver 102 (step S1202). The content designation receiver 102 delivers the content ID of the received content to the license processor 103 (step S1203).

The license processor 103 analyzes the license information 121 of the content corresponding to the received content ID, and processes the license by determining the use conditions or solving the constraint for rendering thereby to generate an operation table 111 (step S1204). The detail of the license processing is explained later.

The license processor 103 determines whether the generated operation table 111 is empty (step S1205). When the operation table 111 is empty (YES: at step S1205), the user I/F 108 indicates the message to the effect that the content cannot be rendered (step S1 206). When the operation table 111 is not empty (NO: at step S1205), on the other hand, the operation execution command generator 106 executes the operation execution command generating process for generating an operation execution command satisfying the constraint stored in the operation table 111 (step S1207). The detail of the operation execution command generating process is explained later.

After generating the operation execution command, the operation execution command generator 106 determines whether the command statement data 114 is empty (step S1208). When the command statement data 114 is empty (YES: at step S1208), the user I/F 108 indicates the message to the effect that the content cannot be rendered (step S1206). When the command statement data 114 is not empty (NO: at step S1208), on the other hand, the content renderer 105 renders the content based on the generated operation execution command (step S1209). The detail of the content rendering process is explained later.

After rendering the content, the user I/F 108 determines whether the user has selected the end of rendering (step S1210). When the rendering end is not selected (NO: at step S1210), the standby mode for content selection is entered. When the rendering end is selected (YES: at step S1210), on the other hand, the content rendering process is completed.

Figure 13:
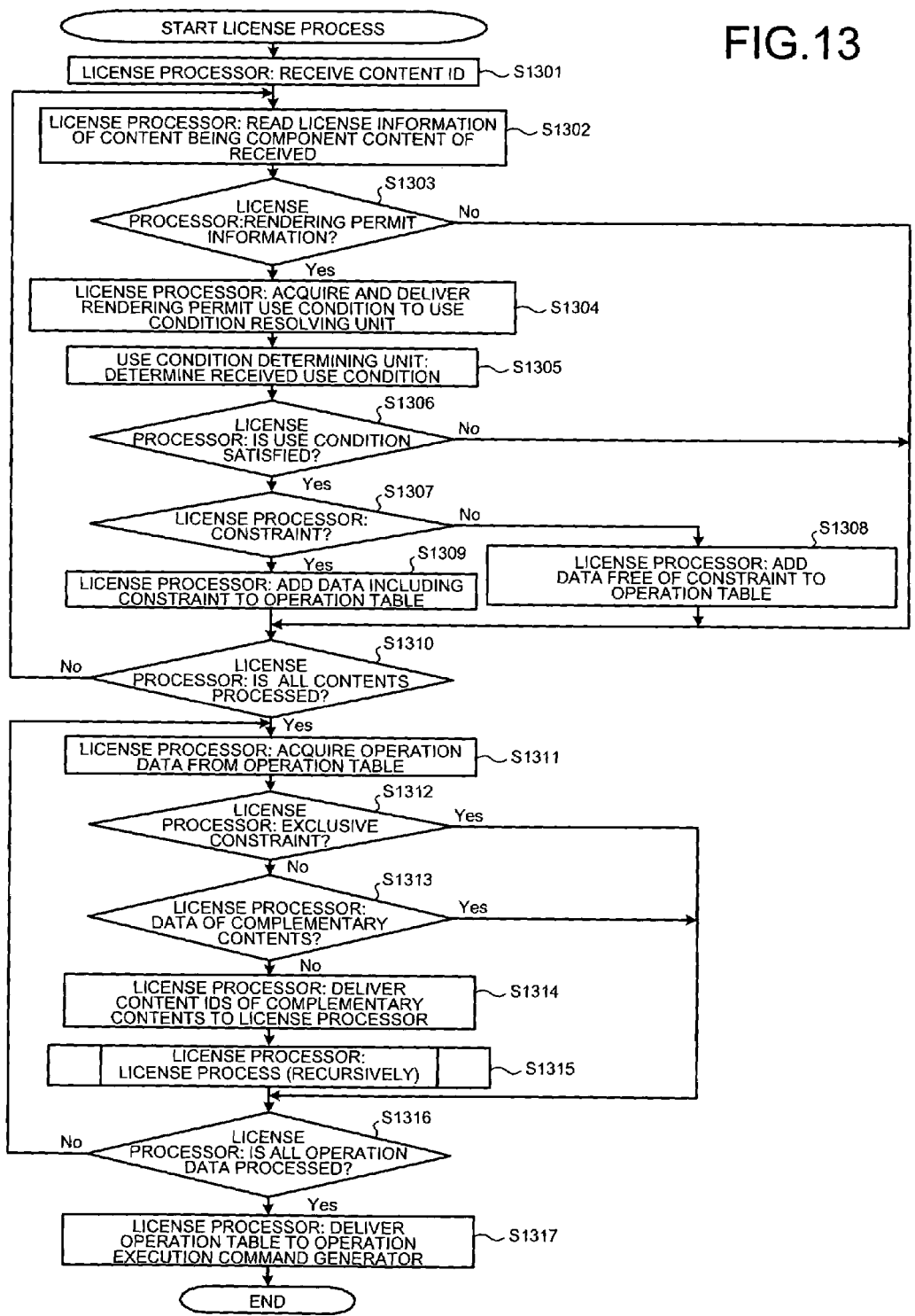
FIG. 13 is a flowchart that depicts the license processing in the digital content rendering apparatus according to this embodiment.

The detail of the license processing shown at step S1204 in FIG. 12 is explained. FIG. 13 is a flowchart that depicts a general flow of the license processing. The license processing is executed recursively by the interlocked operation of the license processor 103 and the use condition determining unit 104 (step S1315).

The license processor 103 receives the content ID from the content designation receiver 102 (step S1301). Next, the process of steps S1302 to S1310 is executed for all the contents making up the component elements of the content corresponding to the received content ID.

The license processor 103 reads the license information 121 of the content making up the component element (step S1302) and determines whether the rendering permit information exists (step S1303). In the absence of the rendering permit information (NO: at step S1303), it is determined whether all the contents have been processed. In the presence of the rendering permit information (YES: at step S1303), on the other hand, the use condition contained in the rendering permit information is acquired and delivered to the use condition determining unit 104 (step S1304).

The use condition determining unit 104, based on the use condition received, determines whether the content satisfies the use conditions, and returns the result of determination to the license processor 103 (step S1305). The use conditions contain the description of such conditions as the valid period, the charging method, the price and the covered area. The use conditions may be determined internally using the environmental information in the digital content rendering apparatus 100 or using an external ASP, or the like through a network. Further, the process may include a dialog for presenting the use conditions and prompting the user to agree thereon.

Based on the result of determination returned from the use condition determining unit 104, the license processor 103 determines whether the content satisfies the use condition (step S1306). When the use conditions are not satisfied (NO: at step S1306), the process proceeds to the determination whether all the contents have been processed. When the use conditions are satisfied (YES: at step S1306), on the other hand, the process proceeds to the determination whether a constraint exists (step S1307).

In the absence of the constraint (NO: at step S1307), the license processor 103 adds the data free of the constraint to the operation table 111 (step S1308). Specifically, the permit operation ("play") free of the constraint is set as the permit operation ("Right"), the content ID of the content being processed is set as the content ID (ID1) of the main content, "Nil" is set as the content ID (ID2) of the constrained content and the constraint type ("Op-Type"), and the "false" is set as "ExistenceCheck" and then they are added as data to the operation table 111.

In the presence of the constraint (YES: at step S1307), on the other hand, the license processor 103 adds the data containing the constraint to the operation table 111 (step S1309). Specifically, the permit operation ("playWithConstraint") extended to have the constraint is set as the permit operation ("Right"), the content ID of the content being processed is set as the content ID (ID1) of the main content, the content ID of the content subjected to constraint is set as the content ID (ID2) of the constraint content, the constraint type acquired from the license information 121 of the content is set as the constraint type ("Op-Type"), and "false" is set in "ExistenceCheck", and then they are added as data to the operation table 111.

After adding the data to the operation table 111, the license processor 103 determines whether all the contents have been processed (step S1310), and when all the contents have been processed (YES: at step S1310), the process proceeds to the next step. When all the contents have not been processed (NO: at step S1310), on the other hand, the process proceeds to the step of reading the contents of the remaining component elements (step S1302).

The license processor 103 executes the process of steps S1311 to S1316 to detect the constraints from the license information 121 of the complementary constraint contents and extract the contents required to be recovered at the same time.

The license processor 103 acquires the operation data from the operation table 111 (step S1311), and determines whether the acquired operation data contains the exclusive constraint (step S1312). When the acquired operation data contains the exclusive constraint (YES: at step S1312), the contents to be recovered at the same time are not required to be extracted, and therefore the process proceeds to the next step.

When the acquired operation data contains no exclusive constraint (NO: at step S1312), on the other hand, it is determined whether the operation data of the complementary contents are existent in the operation table 111 (step S1313). It is determined, for example, whether the operation data having the same ID2 as ID1 of the operation data being processed or the same ID1 as ID2 is existent, and when such operation data is existent (YES: at step S1313), the process proceeds to the next step. This is in order to avoid the endless loop of extraction of constraints: In the absence of the corresponding operation data (NO: at step S1313), the contents ID of the complementary constraint contents are delivered to the license processor 103 (step S1314) and the license is processed-recursively in order to further detect the constraints (step S1315).

The license processor 103 determines whether all the operation data have been processed (step S1316), and when all the operation data have been processed (YES: at step S1316), delivers the operation table 111 to the operation execution command generator 106 (step S1317) thereby to end the license processing. When all the operation data have not been processed (NO: at step S1316), on the other hand, the next operation data is acquired and the process is repeated (step S1311).

Figure 14:
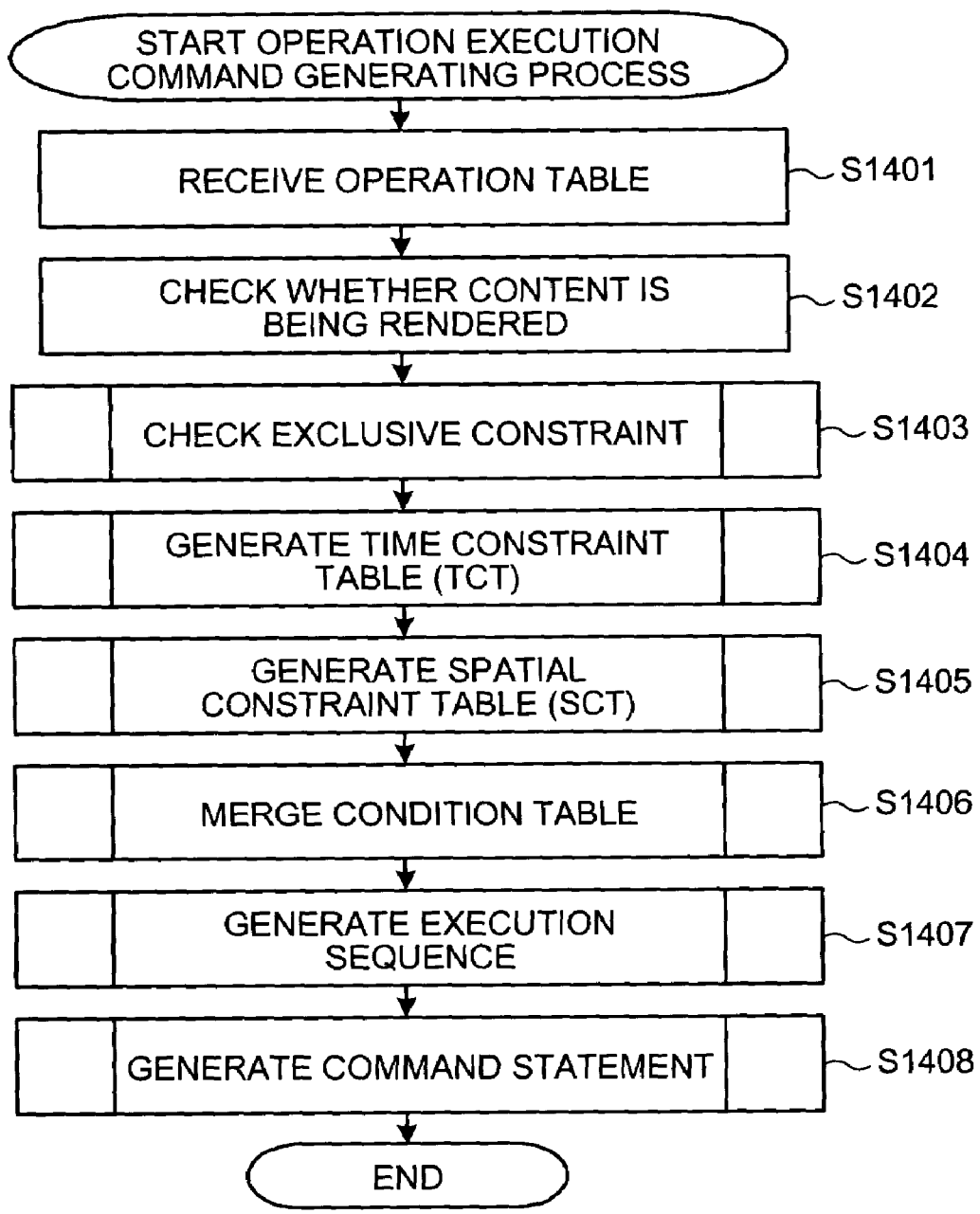
FIG. 14 is a flowchart that depicts the execution command generating process in the digital content rendering apparatus according to this embodiment.

FIG. 14 is a flowchart that depicts an outline of the general flow of the operation execution command generating process shown at step S1207 in FIG. 12.

The operation execution command generator 106 receives the operation table 111 prepared by the license processor 103 (step S1401). Next, the operation execution command generator 106 checks to see whether the content is being rendered, by referring to the specifics of the rendering history data 115 and the operation table 111 received (step S1402). Specifically, when any of the contents ID (ID1) of the main content of the operation data in the operation table 111 is equal to the content ID stored in the rendering history data 115, "ExistenceCheck" of the particular operation data is set to "true".

When there is any content ID that exists in the rendering history data 115 but not in the operation data, the operation data of the content corresponding to the particular content ID is newly added to the operation table 111. In this case, "ExistenceCheck" is set as "true". This data is accessed in the process of prohibiting the rendering of the main content while the exclusive constraint content is being rendered.

After that, the operation execution command generator 106 sequentially executes the steps of checking the exclusive constraint (step S1403), generating the time constraint table (TCT) (step S1404), generating the spatial constraint table (SCT) (step S1405), merging the condition table (step S1406), generating the execution sequence (step S1407) and generating the command statement (step S1408). The detail of these steps is explained below.

Figure 15:
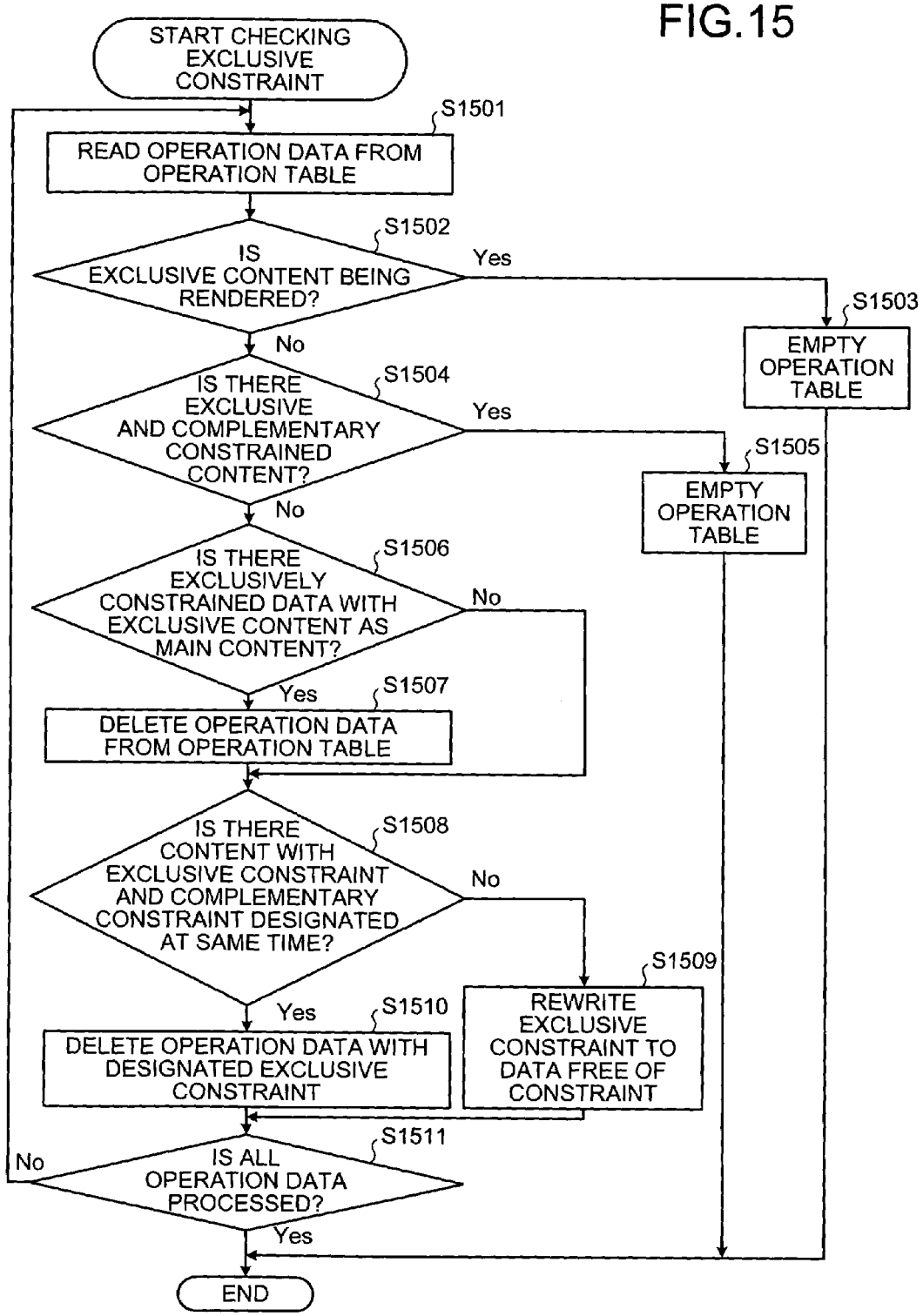
FIG. 15 is a flowchart that depicts the exclusive constraint checking process in the digital content rendering apparatus according to this embodiment.

FIG. 15 is a flowchart that depicts a general flow of the exclusive constraint checking process of step S1403 in FIG. 14.

The operation execution command generator 106 reads the operation data from the operation table 111 (step S1501), and when the read operation data has an exclusive constraint, determines whether an exclusive constraint content is being rendered (step S1502). When an exclusive constraint content is being rendered (YES: at step S1502), the operation table 111 is emptied (step S1503). This is by reason of the fact that since an exclusive constraint content is being rendered, the rendering of the main content designated for rendering is prohibited.

When no exclusive constraint content is being rendered (NO: at step S1502), on the other hand, it is determined whether there exists a constraint content designated as both exclusive and complementary at the same time (step S1504). In the presence of such a constraint content (YES: at step S1504), the operation table 111 is emptied (step S1505). This is in order to prohibit the rendering of the main content since the designation of the same constraint content as both exclusive and complementary at the same time is contradictory.

The operation execution command generator 106 determines whether the operation data defining an exclusive constraint exists in which the content ID of an exclusive constraint content not being rendered is designated as the content ID (ID1) of the main content (step S1506). In the presence of such operation data (YES: at step S1506), the particular operation data is deleted from the operation table 111 (step S1507). This is because the constraint content not being rendered is exclusive with respect to the main content and not required to be rendered.

The operation execution command generator 106 determines whether there exists any content designated to have both the exclusive and the complementary constraint at the same time (step S1508). In the presence of such a content (YES: at step S1508), the operation data designated to have an exclusive constraint is deleted (step S1510). This is by reason of the fact that in the presence of the operation data having a complementary constraint, the operation execution command for rendering the main content can be generated in the operation execution command generating process described later, and therefore the operation data having the exclusive constraint already checked for exclusiveness is not required to be held any longer.

In the absence of the content designated to have both the exclusive constraint and the complementary constraint at the same time (NO: at step S1508), on the other hand, the operation data designated to have the exclusive constraint is rewritten into the operation data free of the constraint (step S1509). Specifically, the data is rewritten such that the permit operation ("play") free of the constraint is as the permit operation ("Right") free of constraint, the content ID of the particular content as the content ID (ID1) of the main-content, "Nil" as the content ID (ID2) and the constraint type ("Op-Type") of the constrained content, and "false" as "ExistenceCheck". This is by reason of the fact that the result of checking the exclusiveness shows that the particular content can be rendered in the same manner as the content free of constraint.

The operation execution command generator 106 determines whether all the operation data have been processed (step S1511), and when all the operation data are not yet processed (NO: at step S1515), the next operation data is acquired and the process is repeated (step S1501). When all the operation data are processed (YES: at step S1511), on the other hand, the exclusive constraint checking process is completed.

Figure 16:
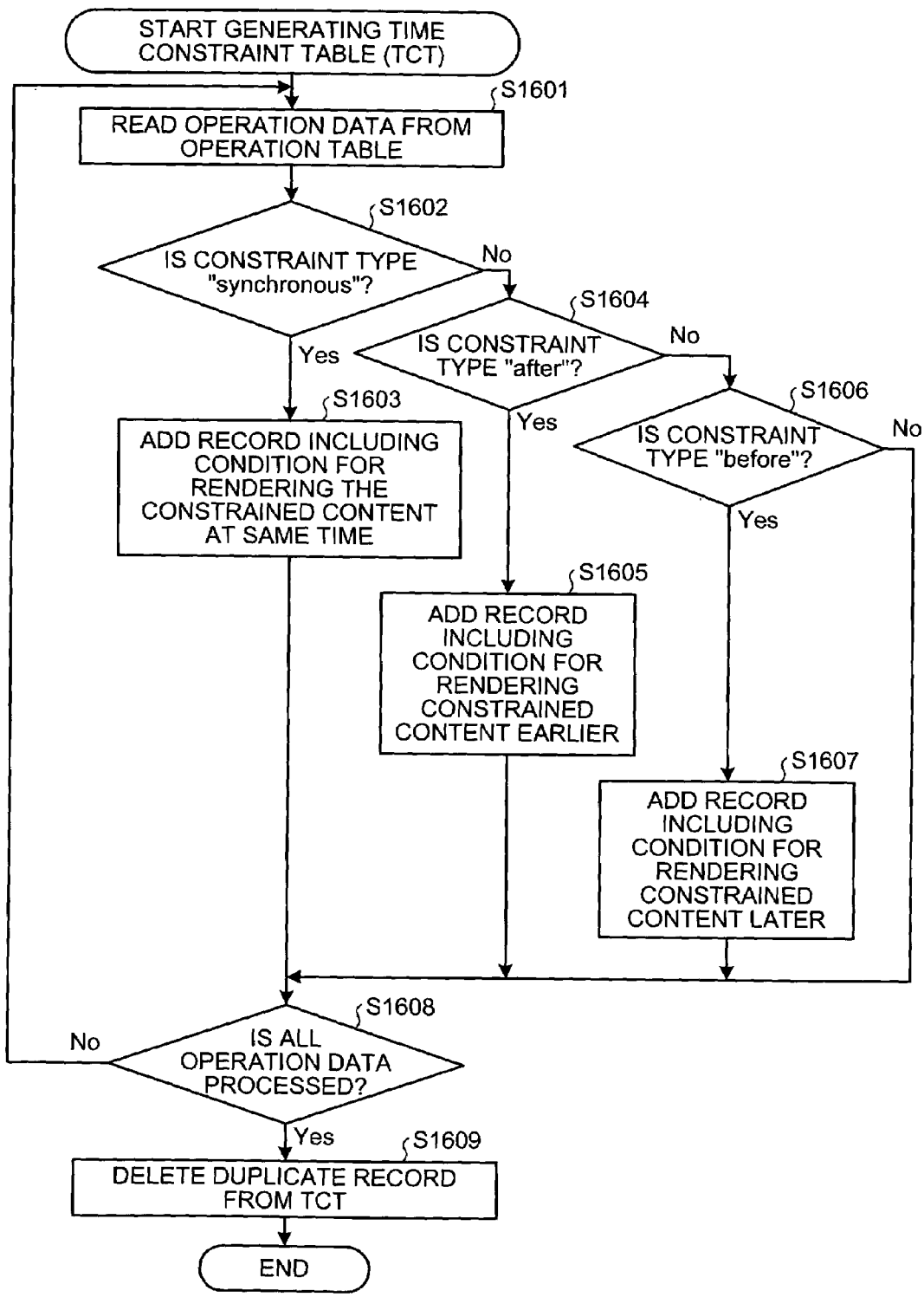
FIG. 16 is a flowchart that depicts the time constraint table (TCT) generating process in the digital content rendering apparatus according to this embodiment.

FIG. 16 is a flowchart that depicts a general flow of the time constraint table (TCT) generating process of step S1404 in FIG. 14.

The operation execution command generator 106 reads the operation data from the operation table 111 (step S1601), and determines whether the constraint type of the operation data thus read is "synchronous" (step S1602).

When the constraint type of the operation data thus read is "synchronous" (YES: at step S1602), the operation execution command generator 106 adds a list of the conditions for rendering the main content and the restrained content at the same time to the TCT 112 (step S1603). Specifically, when the operation data read designates the constraint for rendering the content A and the content B at the same time, for example, the list "(AB&)" is added to the TCT 112. When the constraint type of the operation data read is not "synchronous" (NO: at step S1602), on the other hand, it is determined whether the constraint type of the operation data read is "after" (step S1604).

When the constraint type of the operation data read is "after" (YES: at step S1 604), the operation execution command generator 106 adds the condition for rendering the constrained content earlier to the TCT 112 (step S1605). Specifically, when the operation data read designates the constraint for rendering the content B constituting the constrained content before the content A making up the main content, the list "(B)(A)" is added to the TCT 112. In this way, two lists in which the contents rendered first are described on the left side and the contents rendered next are described on the right side are added to the TCT 112. When the constraint type of the operation data read is not "after" (NO: at step S1604), it is determined whether the constraint type of the operation data read is "before" (step S1606).

When the constraint type of the operation data read is "before" (YES: at step S1606), the operation execution command generator 106 adds a list of conditions for rendering the constrained content later to the TCT 112 (step S1607). Specifically, when the operation data read designates the constraint for rendering the content A constituting the main content before the content B making up the constrained content, the list "(A)(B)" is added to the TCT 112. When the constraint type of the operation data read is not "before" (NO: at step S1606), on the other hand, it is determined whether all the operation data have been processed.

The operation execution command generator 106 determines whether the all the operation data have been processed (step S1608), and when all the operation data have not been processed (NO: at step S1608), the next operation data is acquired and the process is repeated (step S1601). When all the operation data have been processed (YES: at step S1608), on the other hand, the record duplicated in the TCT 112 is deleted (step S1609) thereby to end the time constraint table (TCT) generating process.

Figure 17:
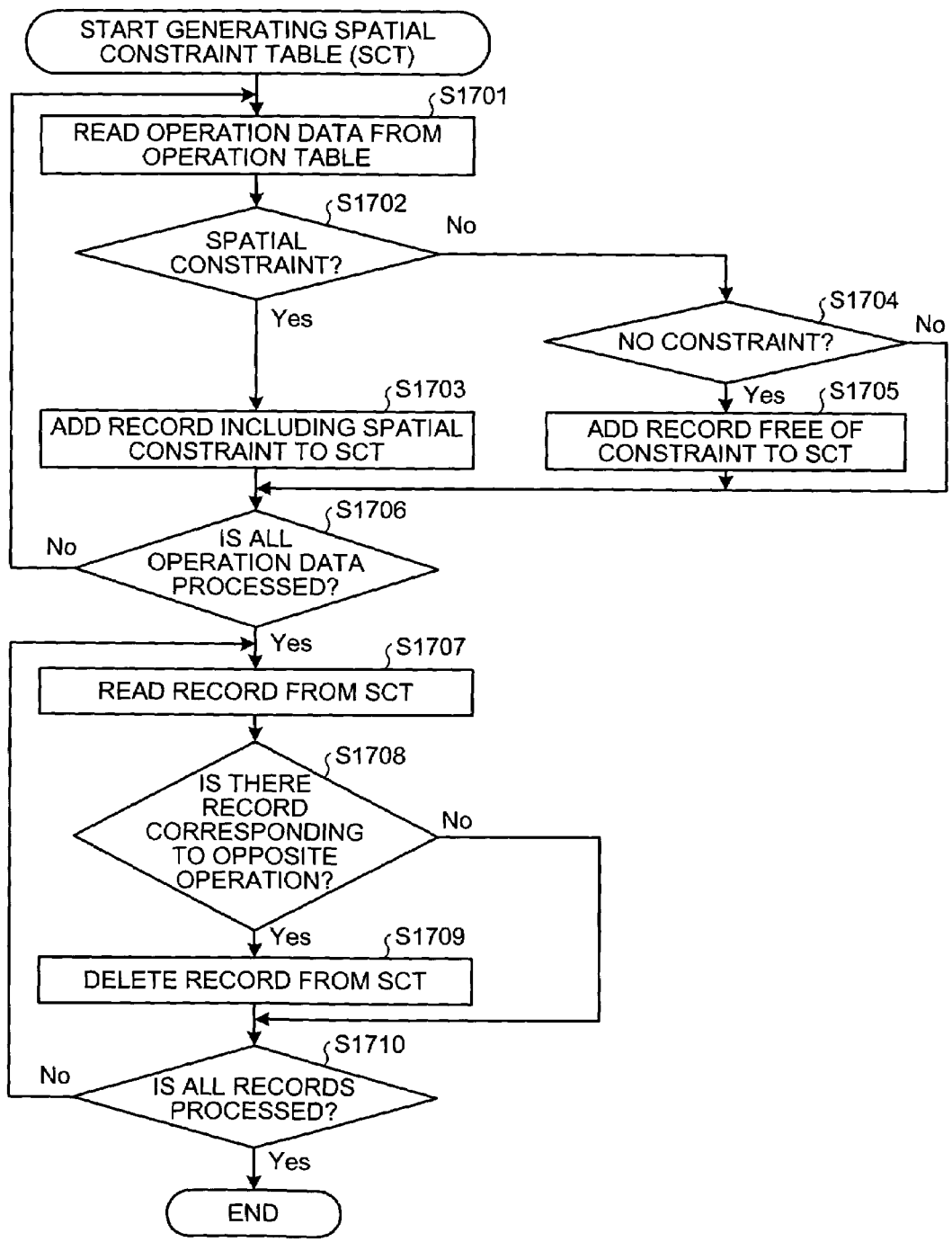
FIG. 17 is a flowchart that depicts the spatial constraint table (SCT) generating process in the digital content rendering apparatus according to this embodiment.

FIG. 17 is a flowchart that depicts a general flow of the spatial constraint table (SCT) generating process of step S1405 shown in FIG. 14.

The operation execution command generator 106 reads the operation data from the operation table 111 (step S1701), and determines whether the operation data read contains the spatial constraint (step S1702).

When the operation data read contains the spatial constraint (YES: at step S1 702), the operation execution command generator 106 adds the record defining the spatial constraint to the SCT113 (step S1703). Specifically, when the operation data read designates the constraint for rendering such that the content A constituting the main content satisfies the content B making up the constrained content and the constraint type Op, for example, the list "(A Op B)" is added to the SCT 113. The constraint type such as (1) "above", (2) "below", (3) "rightSide", (4) "leftSide", (5) "backward", (6) "forward" or (7) "anywhere" is set as "Op".

When the operation data read contains no spatial constraint (NO: at step 81702), on the other hand, it is determined whether the operation data read is free of constraint (step S1704).

When the operation data read is free of constraint (YES: at step S1704), the operation execution command generator 106 adds the record free of constraint to the SCT113 (step S1705). Specifically, when the operation data read is such as to render the content A individually free of constraint, for example, the list "(A)" is added to the SCT 113.

The operation execution command generator 106 determines whether all the operation data have been processed (step S1706), and when all the operation data have not been processed (NO: at step S1706), the next operation data is acquired and the process is repeated (step S1701). When all the operation data have been processed (YES: at step S1706), on the other hand, the process proceeds to the next step.

At steps S1707 to S1710, the operation execution command generator 106 extracts and deletes the records indicating substantially the same condition from the records of the SCT 113 prepared.

A record is read from the SCT 113 (step S1707), and it is determined whether there exists any other record corresponding to the operation opposite to the operation of the record read (step S1708). Specifically, when the record read is "(A above B)", for example, the operation "below" opposite to the operation "above" is acquired from the constraint relationship dictionary 109, and it is determined whether the record "(B below A)" generated by replacing the content ID for the opposite operation acquired is existent in the SCT 113.

In the presence of a record corresponding to the opposite operation (YES: at step S1708), the corresponding record is deleted from the SCT113 (step S1709). In the absence of a record corresponding to the opposite operation (NO: at step S1708), on the other hand, it is determined whether all the records have been processed (step S1710). When all the records have not been processed (NO: at step S1710), the next record is read and the process is repeated (step S1707). When all the records have been processed (YES: at step S1710), the spatial constraint table (SCT) generating process is completed.

Figure 18:
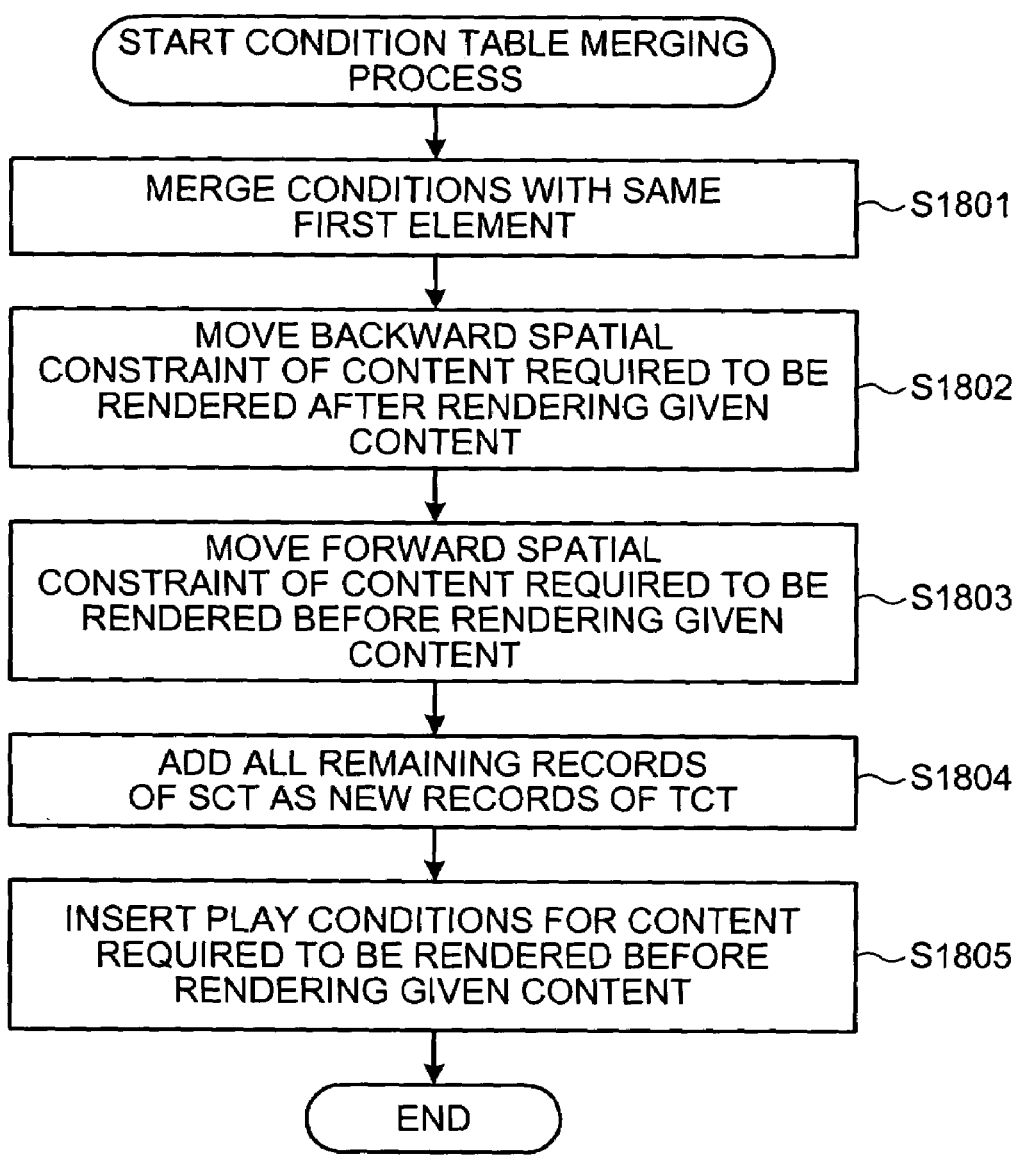
FIG. 18 is a flowchart that depicts an outline of the condition table merging process in the digital content rendering apparatus according to this embodiment.

FIG. 18 is a flowchart that depicts an outline of a general flow of the condition table merging process of step S1406 shown in FIG. 14.

The operation execution command generator 106 merges the list of the SCT 113 and the list of the TCT 112 that have the same leading element (step S1801).

The "leading element" is defined as the content ID described on the left side of the list, or the content ID, f any, which is the only content ID designated. In the list "(A below B)", for example, "A" is the leading element. Similarly, "C" is the leading element in the list "(C)".

A list containing the spatial constraint of the content required to be rendered after a given content is moved behind the list of the contents to be rendered earlier (step S1802). Further, a list containing the spatial constraint of the content required to be rendered before a given content is moved before the list of the contents rendered later (step S1803). After that, all the remaining records of the SCT 113 are added as new records of the TCT 112 (step S1804). Finally, a list describing the condition for rendering the content required to be rendered before a given content is inserted before the list of the contents rendered later (step S1805). The detailed process at steps S1801 to S1803 and S1805 is described later.

Figure 19A:
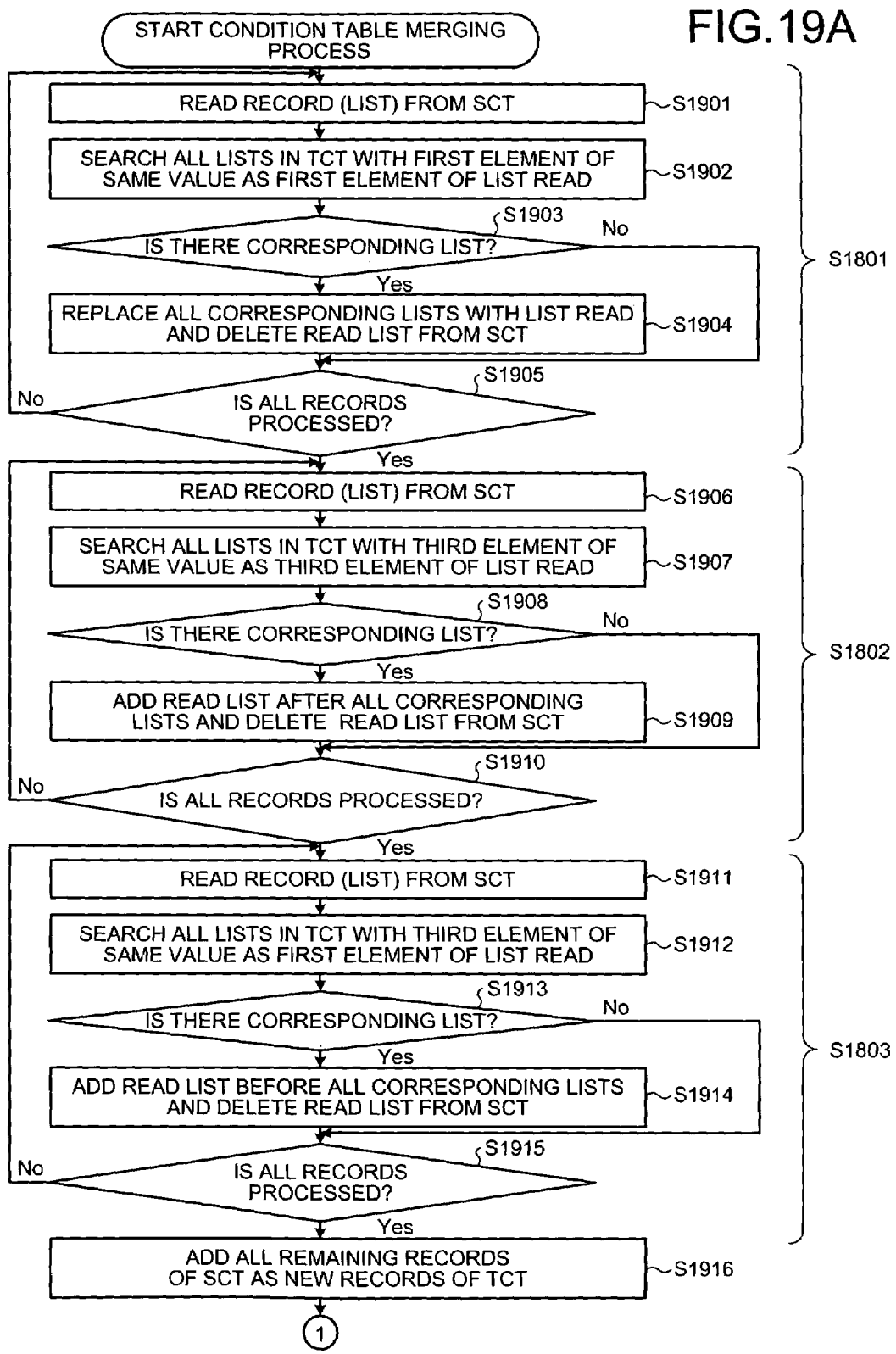
FIG. 19A is a flowchart that depicts the condition table merging process in the digital content rendering apparatus according to this embodiment.
Figure 19B:
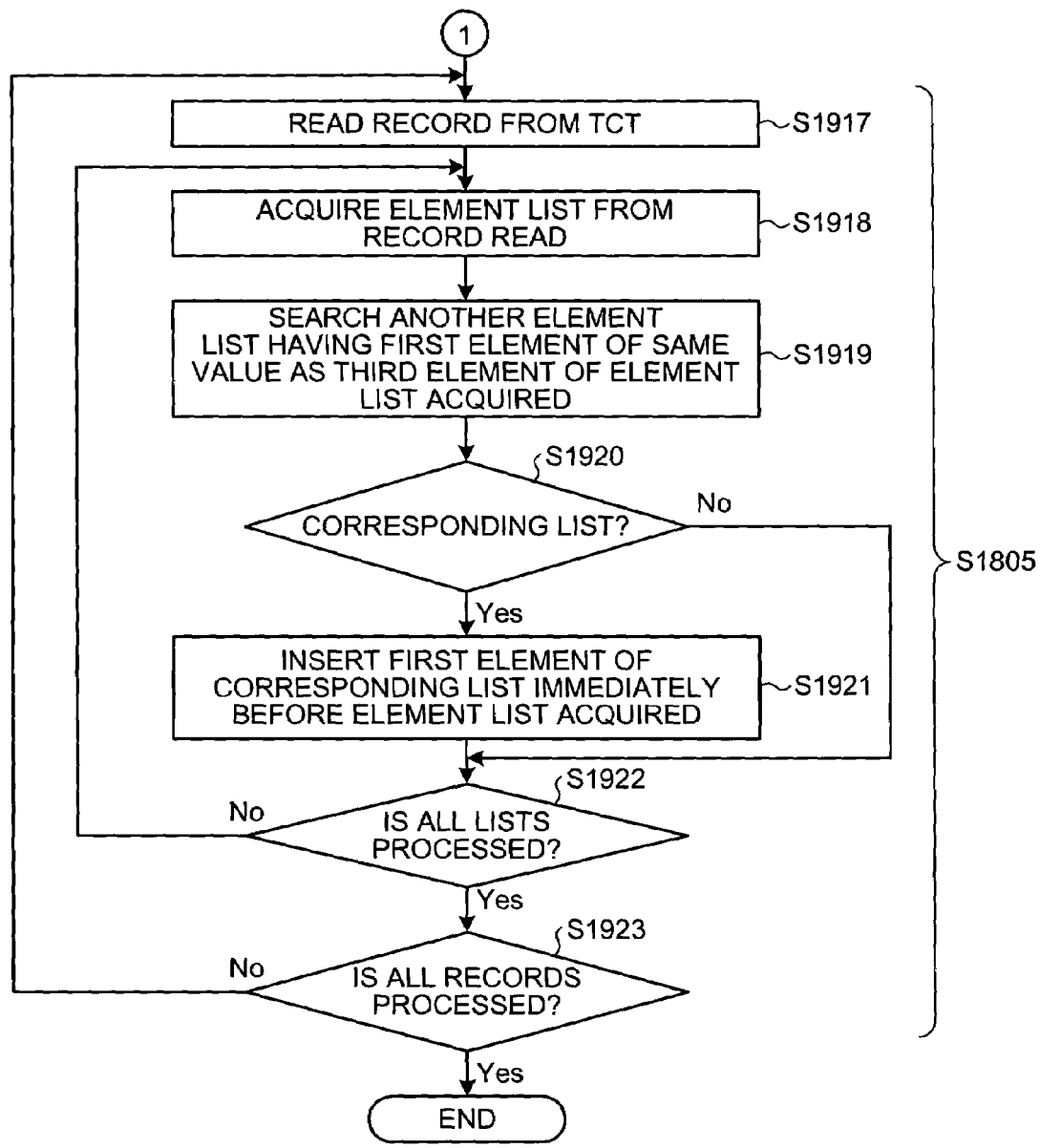
FIG. 19B is a flowchart that depicts the condition table merging process in the digital content rendering apparatus according to this embodiment.

FIGS. 19A and 19B are flowcharts that depict a general flow of the condition table merging process of step A1406 shown in FIG. 14. Also, FIGS. 19A and 19B show the detailed process of steps S1801 to S1803 and S1805 of which the outline is explained with reference to FIG. 18.

Steps S1901 to S1905 indicate the detailed process of step S1801 in FIG. 18. First, the operation execution command generator 106 reads the record from the SCT 113 (step S1901). The SCT 113 stores each list as one record, and therefore to read one record is equivalent to reading one list. Next, all the lists in the TCT 112 having a leading element of the same value as the leading element of the list read are searched (step S1902), and it is determined whether a corresponding list exists (step S1903).

In the absence of a corresponding list (NO: at step S1903), it is determined whether all the records have been processed. In the presence of a corresponding list (YES: at step S1903), on the other hand, all the corresponding lists are replaced by the list read, which is deleted from the SCT 113 (step S1904).

When the list "(A below B)" is stored in the SCT 113 and the list "(B)(A)" is stored in the TCT 112, for example, the list "(B)(A)" of the TCT 112 is replaced by the list "(B)(A below B)", which is deleted from the SCT 113.

The operation execution command generator 106 determines whether all the records have been processed (step S1905), and when all the records have not been processed (NO: at step S1905), the next record is acquired and the process is repeated (step S1901). When all the records have been processed (YES: at step S1905), on the other hand, the process proceeds to the next step.

Steps S1906 to S1910 represent the detailed process of step S1802 in FIG. 18. First, the operation execution command generator 106 reads a record (list) from the SCT 113 (step S1906). Next, all the lists in the TCT112 having, as a leading element, the same value as the third element of the list read are searched (step S1907), and it is determined whether a corresponding list exists (step S1908).

The third element is defined as the content ID of the constrained content in the spatial constraint. Specifically, it is the content ID"Y" in the list described in the form of "(X Op Y)" ("X", "Y" indicate the content ID, and "Op" the constraint type).

In the absence of a corresponding list (NO: at step S1908), it is determined whether all the records have been processed. In the presence of a corresponding list (YES: at step S1908), on the other hand, the list read is added behind all the corresponding lists, and the list read is deleted from the SCT 113 (step S1909).

When the list "(A below B)" is stored in the SCT 113, and the list "B" in TCT 112, for example, the list "(A below B)" is added behind the list "B" of the TCT 112 to form the list "(B)(A below B)", and the list "(A below B)" is deleted from the SCT 113.

The operation execution command generator 106 determines whether all the records have been processed (step S1910), and when all the records have not been processed (NO: at step S1910), the next record is acquired and the process is repeated (step S1906). When all the records have been processed (YES: at step S1910), the process proceeds to the next step.

Steps S1911 to S1915 represent the detailed process of step S1803 in FIG. 18. First, the operation execution command generator 106 reads the record (list) from the SCT113 (step S1911). Next, all the lists in the TCT112 having a third element of the same value as the first element of the list read are searched (step S1912) to determine whether a corresponding list exists (step S1913).

In the absence of a corresponding list (NO: at step S1913), it is determined whether all the records have been processed. In the presence of a corresponding list (YES: at step S1913, on the other hand, the list read is added before all the corresponding lists, and the particular list read is deleted from the SCT 113 (step S1914).

When the list "(A below B)" is stored in the SCT 113, and the list "(C below A)" in the TCT 112, for example, the list "(A below B)" is added before the list "(C below A)" of the TCT 112 to form the list "(A below B)(C below A)", and the list "(A below B)" is deleted from the SCT 113.

The operation execution command generator 106 determines whether all the records have been processed (step S1915), and when all the records have not been processed (NO: at step S1915), the next record is acquired and the process is repeated (step S1911). When all the records have been processed (YES: at step S1915), on the other hand, the process proceeds to the next step.

The next step S1916 is the same as step S1804 in FIG. 18. At step S1916, the process of adding all the remaining records of the SCT 113 as new records of the TCT 112 is executed. This is by reason of the fact that the list designating the contents rendered individually free of constraint and the contents existing only in the spatial constraint table (SCT) 113 is not merged with the TCT 112 in the aforementioned process and therefore newly added to the TCT 112 in preparation for generation of the execution sequence processed based on the TCT 112. The detailed process of generating the execution sequence is described later.

Steps S1917 to S1923 represent the detailed process of step S1805 shown in FIG. 18. First, the operation execution command generator 106 reads the record from the TCT 112 (step S1917). Next, the element list is acquired from the record read (step S1918).

The element list is defined as a unit containing the description of individual constraints and defined by parentheses. When the record is "(C)(B below C)(A below B)", for example, "(C)", "(B below C)" and "(A below B)" constitute element lists.

Another element list having the first element of the same value as the third element in the element list is searched (step S1919) to determine whether a corresponding list exists (step S1920).

In the absence of a corresponding list (NO: at step S1920), it is determined whether all the records have been processed. In the presence of a corresponding list (YES: at step S1920), on the other hand, the first element of the corresponding list is inserted immediately before the element list acquired (step S1921).

When the list "(B below A)(A below C)" is stored in the TCT 112, for example, the first element "(A)" of the list "(A below C)" is inserted before the list "(B below A)(A below C)" thereby to form the list "(A)(B below A)(A below C)".

The operation execution command generator 106 determines whether all the lists have been processed (step S1922), and when all the lists have not been processed (NO: at step S1922), the next list in the record is acquired, and the process is repeated (step S1918). When all the lists have been processed (YES: at step S1922), on the other hand, the process proceeds to the next step.

The operation execution command generator 106 determines whether all the records have been processed (step S1923), and when all the records have not been processed (NO: at step S1923), the next record is acquired, and the process is repeated (step S1917). When all the records have been processed (YES: at step S1923), on the other hand, the condition table merging process is completed.

Figure 20:
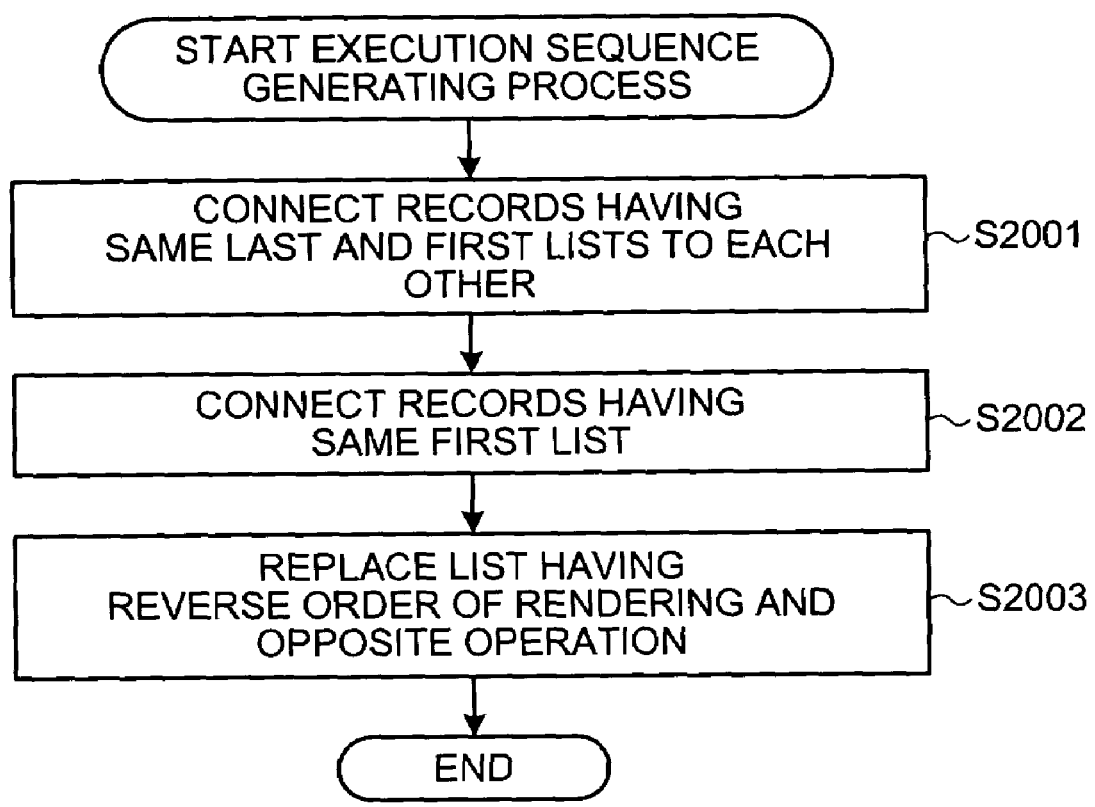
FIG. 20 is a flowchart that depicts an outline of the execution sequence generating process in the digital content rendering apparatus according to this embodiment.

FIG. 20 is a flowchart that depicts an outline of a general flow of the execution sequence generating process of step S1407 shown in FIG. 14.

The operation execution command generator 106 connects the records having the same last and first lists in the TCT 112 (step S2001).

The last list is defined as the element list existing at the right end of the record, and the first list the element list existing at the left end of the record. When the record is "(C)(B below C)(A below B)", for example, the list "(C)" is the first list and the list "(A below B)" is the last list.

The records having the same first list are connected to each other (step S2002). Finally, the process of replacing the lists rendered in the reverse order and having the opposite operation is executed (step S2003). The detailed process of steps S2001 to S2003 is explained later.

Figure 21:
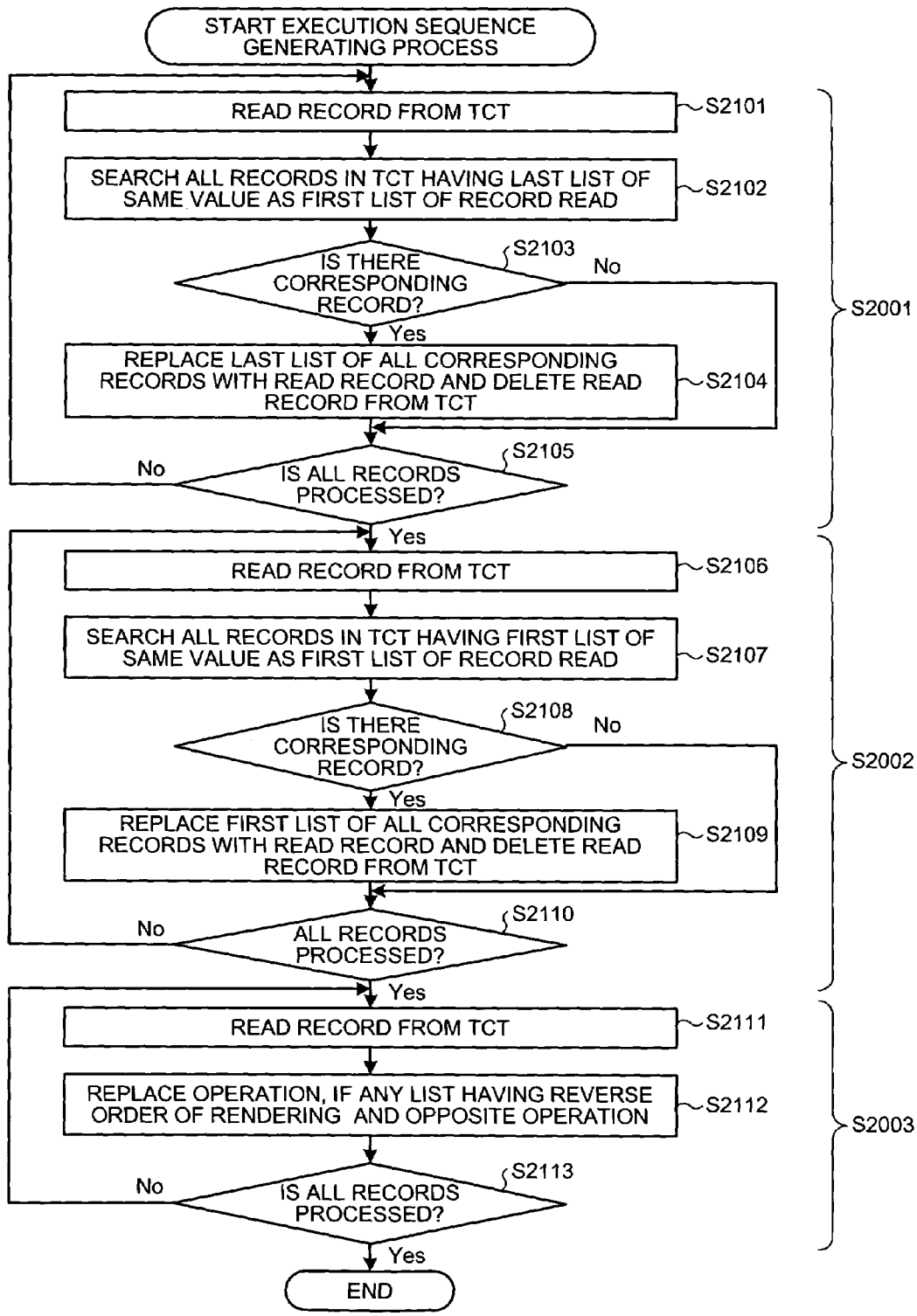
FIG. 21 is a flowchart that depicts an outline of the execution sequence generating process in the digital content rendering apparatus according to this embodiment.

FIG. 21 is a flowchart that depicts a general flow of the execution sequence generating process of step S1407 shown in FIG. 14. FIG. 20 shows the detailed process of steps S2001 to S2003 of which an outline has been explained with reference to FIG. 20.

Steps S2101 to S2105 represent the detailed process of step S2001 in FIG. 20. First, the operation execution command generator 106 reads the record from the TCT12 (step S2101). Next, all the records in the TCT 112 having the last list identical with the first list of the record read are searched (step S2102) to determine whether a corresponding record exists (step S2103).

In the absence of a corresponding record (NO: at step S2103), it is determined whether all the records have been processed. In the presence of a corresponding list (YES: at step S2103), on the other hand, the last lists of all the corresponding records are replaced by the record read, which is deleted from the TCT 112 (step S2104).

When the record "(C)(B below C)(A below B)" and the record "(D)(C)" are stored in the TCT 112, for example, the last list "(C)" of the record "(D)(C)" is replaced by the record "(C)(B below C)(A below B)", and the record "(C)(B below C)(A below B)" is deleted, with the result that only the record "(D)(C)(B below C)(A below B)" remains.

The operation execution command generator 106 determines whether all the records have been processed (step S2105), and when all the records have not been processed (NO: at step S2105), the next record is acquired, and the process is repeated (step S2101). When all the records have been processed (YES: at step S2105), on the other hand, the process proceeds to the next step.

Steps S2106 to S2110 represent the detailed process of step S2002 in FIG. 20. First, the operation execution command generator 106 reads the record from the TCT 112 (step S2106). Next, all the records in the TCT 112 having a first list identical with the first list of the record read are searched (step S2107) to determine whether a corresponding record exists or not (step S2108).

In the absence of a corresponding record (NO: at step S2108), it is determined whether all the records have been processed. In the presence of a corresponding record (YES: at step S2108), on the other hand, the first lists of all the corresponding records are replaced by the record read, which is deleted from the TCT 112 (step S2109).

When the record "(B below C)(A below B)" and the record "(B below C)(C)" are stored in-the TCT 112, for example, the first list "(B below C)" of the record "(B below C)(C)" is replaced by the record "(B below C)(A below B)", and the record "(B below C)(A below B)" is recorded, with the result that only the record "(B below C)"(A below B)(C)" remains.

The operation execution command generator 106 determines whether all the records have been processed (step S2110), and when all the records have not been processed (NO: at step S2110), the next record is acquired, and the process is repeated (step S2106). When all the records have been processed (YES: at step S2110), on the other hand, the process proceeds to the next step.

Steps S2111 to S2113 represent the detailed process of step S2003 in FIG. 20. First, the operation execution command generator 106 reads the record from the TCT 112 (step S2111). Then, the operation execution command generator 106 looks for a list in the read records having the reverse order of rendering and the opposite operation, and in the presence of a corresponding list, replaces the operation.

Specifically, the operation execution command generator 106 looks for a list constituting a pattern "(X aa Y )##(Y)" or "(X aa Y )##(Y bb X )", acquires the operation "cc" opposite to "aa" from the constraint relationship dictionary 109, and replaces "(X aa Y)" with "X" and "Y" with "(Y cc X)", which "X", "Y" designate the content ID, "aa", "bb", "cc" a constraint type, "" a character string and "##" an element list.

In the case of the pattern "(X below Y)(Y)", for example, "X" is required to be rendered below "Y" according to the spatial constraint "below" after rendering of "Y". In spite of this, the rendering of "Y" is designated later, and therefore both the alteration of the order of rendering and the conversion to the opposite operation are required.

When the record "(B below C)(A below B)(C)" is stored in the TCT 112, for example, the list "(B below C)" is replaced by "(B)", and the list "(C)" by the list "(C above B)". Thus, the whole record is replaced by "(B)(A below B)(C above B)".

The operation execution command generator 106 determines whether all the records have been processed (step S2113), and when all the records have not been processed (NO: at step S2113), the next record is acquired, and the process is repeated (step S2111). When all the records have been processed (YES: at step S2113), on the other hand, the execution sequence generating process is ended.

Figure 22:
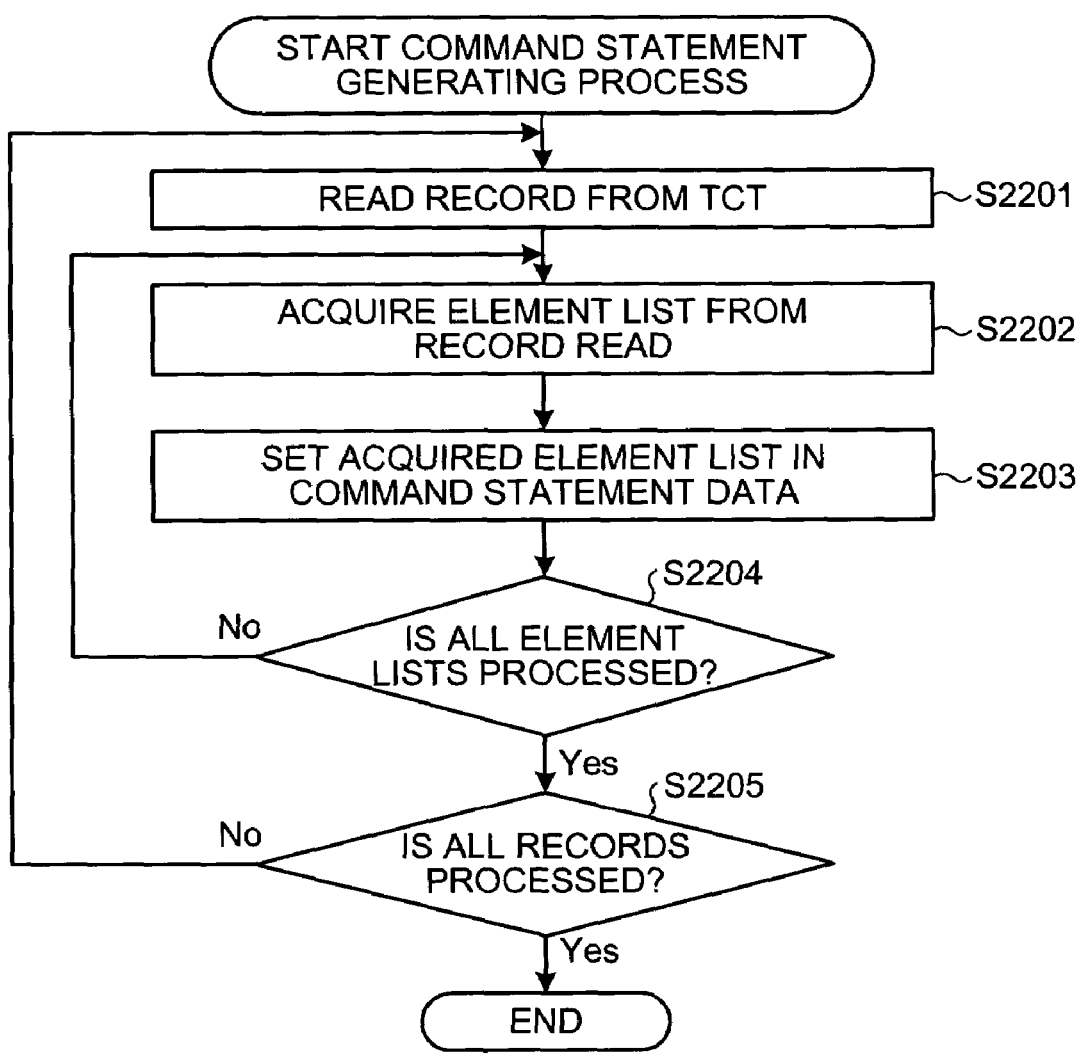
FIG. 22 is a flowchart that depicts the command statement generating process in the digital content rendering apparatus according to this embodiment.

FIG. 22 is a flowchart that depicts a general flow of the command statement generating process of step S1408 shown in FIG. 14.

The operation execution command generator 106 reads the record from the TCT112 (step S2201). Further, an element list is acquired from the record read (step S2202). Next, the acquired element list is converted into a command statement, and the command statement thus converted is set in the command statement data 114 (step S2203). Specifically, a text with "Play" added before the element list acquired is set as a command statement. When the element list is "(X aa Y bb Z)", for example, "Play(X aa Y bb Z)" is set as a command statement in the command statement data 114.

The operation execution command generator 106 determines whether all the element lists have been processed (step S2204), and when all the element lists have not been processed (NO: at step S2204), the next element list is acquired, and the process is repeated (step S2202). When all the records have been processed (YES: at step S2204), on the other hand, it is determined whether all the records have been processed.

The operation execution command generator 106 determines whether all the records have been processed (step S2205), and when all the records have not been processed (NO: at step S2205), the next record is acquired, and the process is repeated (step S2201). When all the records have been processed (YES: at step S2205), on the other hand, the command statement generating process is ended.

Figure 23:
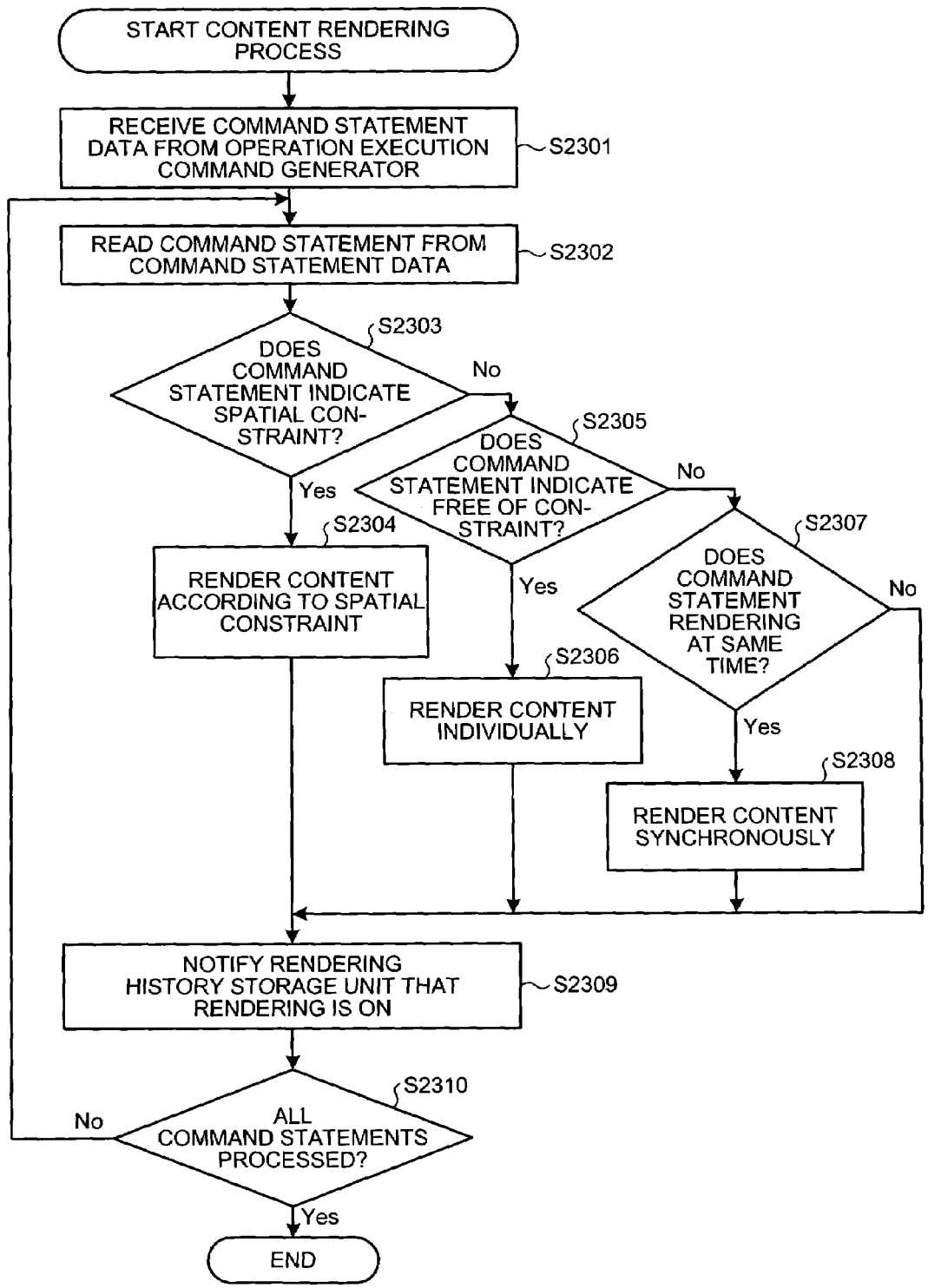
FIG. 23 is a flowchart that depicts the content rendering process in the digital content rendering apparatus according to this embodiment.

FIG. 23 is a flowchart that depicts a general flow of the content rendering process of step S1209 shown in FIG. 12.

The content renderer 105 receives the command statement data 114 prepared by the operation execution command generator 106 (step S2301). Then, the content renderer 105 reads the command statement from the command statement data 114 received (step S2302), and determines whether the command statement is a spatial constraint (step S2303).

When the command statement is a spatial constraint (YES: at step S2303), the content renderer 105 renders the content according to the particular spatial constraint (step S2304). Specifically, when the command statement is "Play(A above B)", for example, the content A is rendered in such a manner as to be arranged above the content B. When the command statement is not a spatial constraint (NO: at step S2303), on the other hand, it is determined whether the command statement is free of constraint (step S2305).

When the command statement is free of constraint (YES: at step S2305), the content renderer 105 renders the particular content alone (step S2306). Specifically, when the command statement is "Play(A)", for example, the content A alone is rendered. When the command statement is not a constraint (NO: at step S2305), on the other hand, it is determined whether the command statement is a constraint for simultaneous rendering (step S2307).

When the command statement is a constraint for simultaneous rendering (YES: at step S2307), the content renderer 105 renders the two contents in synchronism with each other (step S2308). Specifically, when the command statement is "Play(AB&)", for example, the content A and the content B are rendered at the same time. When the command statement is not a constraint for simultaneous rendering (NO: at step S2307), on the other hand, the process proceeds to the next step.

The content renderer 105 notifies the rendering history storage unit 107 that the content rendered is being rendered (step S2309). The rendering history data storage unit 107 adds the content ID of the notified content to the rendering history data 115.

The content renderer 105 determines whether all the command statements have been processed (step S2310), and when all the command statements have not been processed (NO: at step S2310), the next command statement is acquired, and the process is repeated (step S2302). When all the command statements have been processed (YES: at step S2310), on the other hand, the content rendering process is ended.

FIGS. 24 to 27 are diagrams for explaining an example of content rendering executed according to the content rendering process described above in the digital content rendering apparatus 100 according to this embodiment In the case of FIG. 24, the constraints between four contents including the contents A to D shown in FIG.24A are defined. Specifically, the constraint is defined for rendering the content A after the content B below the content B, the constraint is defined for rendering the content B below the content C and the constraint is defined for rendering the content C after the content D. FIGS. 24B to 24F show the contents of each table up to the execution sequence generation upon designation of rendering of the content A in the presence of the constraint.

This constraint is described in each license information of the contents A to D. First, each license information of these contents is read by the license processing (step S1204) to generate the operation table 111 shown in FIG. 24B. By referring to this table, the TCT 112 shown in FIG. 24C is generated by the time constraint table (TCT) generating process (step S1404), and the SCT 113 shown in FIG. 24D by the spatial constraint table (SCT) generating process (step S1405) in the operation execution command generating process (step S1207). Also, these tables are convoluted as shown in FIG. 24E by the condition table merging process (step S1406), and connected as shown in FIG. 24F by the execution sequence generating process (step S1407).

Specifically, as shown in FIG. 24F, the execution sequence is generated such that the content D is rendered first, then the content C is rendered. The content B is rendered in such a manner as to be arranged below the content C after rendering of the content C, and the content A is rendered in such a manner as to be arranged below the content B after rendering of the content B.

As described above, when the constraint shown in FIG. 24A is defined, each content is rendered in such a manner as to satisfy the particular constraint.

In the case of FIG. 25, the constraint is defined between the five contents including the contents A1 to D shown in FIG. 25A. Specifically, the constraint is defined for rendering the content A1 at the same time as the content D, and for rendering the content A2 below and after the content B, and for rendering the content B below the content C. FIGS. 25B to 25F show the specifics of each table from designation of rendering of the content A to the generation of the execution sequence in the presence of the constraint described above.

In the case of FIG. 25, as shown in FIG. 25F, the execution sequence is generated so that the content A1 and the content D are rendered at the same time first, then the content C is rendered. The content B is rendered after the content C in such a manner as to be arranged below the content C, and the content A2 is rendered after the content B in such a manner as to be arranged below the content B.

In the case of FIG. 26, the constraint between the three contents including the contents A to C shown in FIG. 26A is defined. Specifically, the constraint is defined for rendering the content A below and after the content B, and rendering the content B below and before the content C. FIGS. 26B to 26F show the specifics of each table up to the execution sequence generation upon designation of rendering of the content A in the presence of the aforementioned constraint.

In the case of FIG. 26, as shown in FIG. 26F, the execution sequence is generated so that the content B is rendered first, the content A is rendered after the content B in such a manner as to be arranged below the content B, and the content C is rendered after the content B in such a manner as to be arranged above the content B.

In the case of FIG. 27, the constraint between the two contents including the contents A and B shown in FIG. 27A is defined. Specifically, the constraint is defined for rendering the content A below and after the content B and rendering the content B above and before the content A FIGS. 27B to 27F show the specifics of each table up to the execution sequence generation upon designation of rendering of the content A in the presence of the aforementioned constraint In the case of FIG. 27, as shown in FIG. 27F, the execution sequence is generated so that the content B is rendered first and the content A is rendered after the content B in such a manner as to be arranged below the content B.

Figure 28:
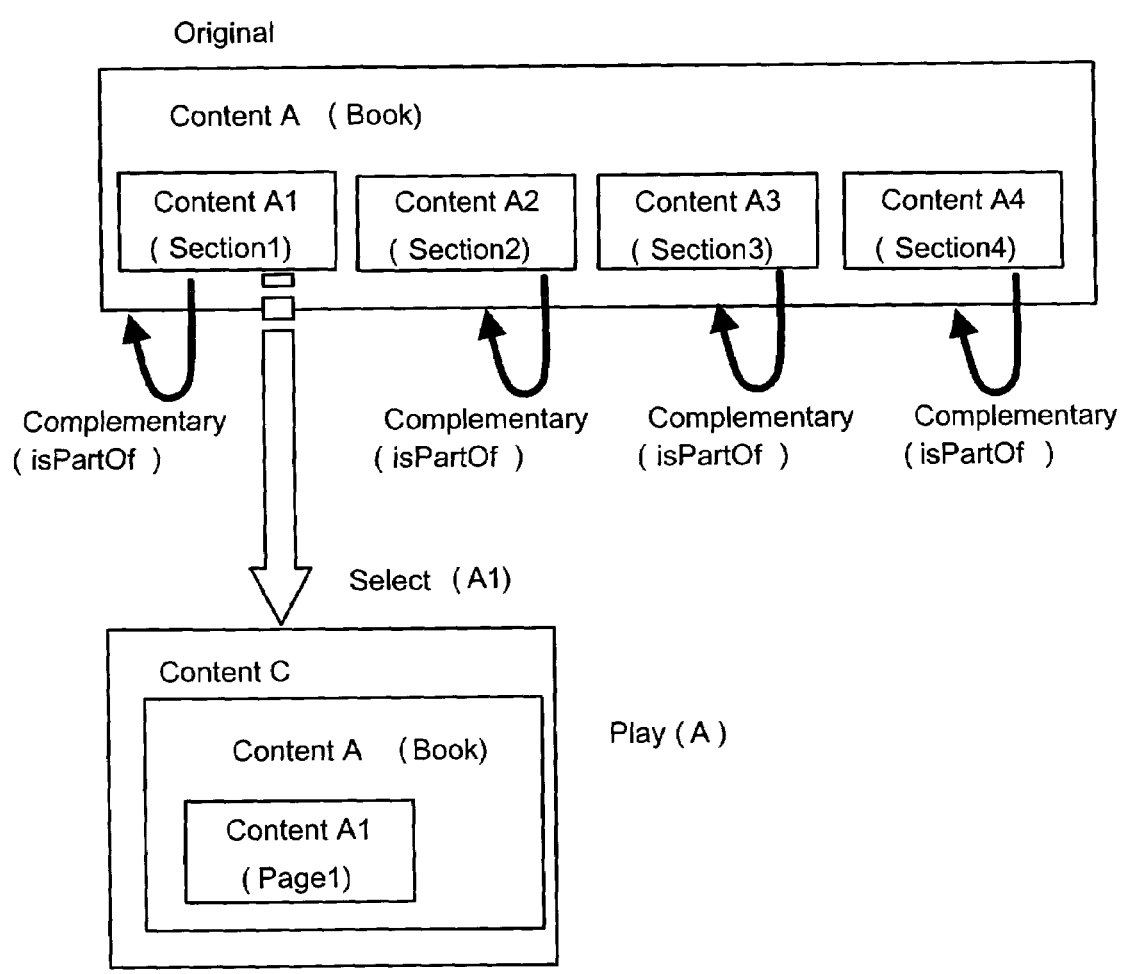
FIG. 28 is a schematic diagram that depicts an example of content rendering based on the structural constraint in the digital content rendering apparatus according to this embodiment.

FIG. 28 is a diagram that explains an example of content rendering executed based on the structural constraint in the digital content rendering apparatus 100 according to this embodiment. In this case, the original content is an electronic book (ContentA) configured of four contents including Section 1 (ContentA1) to Section 4 (ContentA4). This electronic book can be rendered section by section, and each section has a structural constraint of "isPartOf" with the book. When the rendering of ContentA1 is designated, therefore, the electronic book (ContentA) including only Section 1 is rendered.

As described above, when the constraint defined between two contents exists in the digital content rendering apparatus 100, the rendering of each content can be executed in such a manner as to satisfy the particular constraint.

The digital content rendering apparatus 100 according to this embodiment comprises a controller such as a CPU, a storage unit such as a ROM (read only memory) or a RAM, an external storage unit such as a HDD or a CD drive, a display unit such as a display unit and an input device such as a keyboard or a mouse. The apparatus 100 thus is configured of hardware using the normal computer.

The digital content rendering program executed in the digital content rendering apparatus 100 according to this embodiment is provided by being recorded in a computer-readable recording medium such as a CD-ROM, a flexible disk (FD), CD-R or DVD (digital versatile disk) in the form adapted to be installed or executed.

Also, the digital content rendering program executed in the digital content rendering apparatus 100 according to this embodiment may be configured to be provided by being stored on the computer connected to a network such as the internet and downloaded through the network. Further, the digital content rendering program executed in the digital content rendering apparatus 100 according to this embodiment may be configured to be provided or distributed through a network such as the internet.

The digital content rendering program according to this embodiment may be configured to be provided by being built in a ROM or the like in advance.

The digital content rendering program executed in the digital content rendering apparatus 100 according to this embodiment is configured of modules including the parts described above (the content storage controller, the content designation receiver, the license processor, the use condition determining unit, the content renderer, the operation execution command generator, and the rendering history data storage unit). As actual hardware, the CPU (processor) executes by reading the digital content rendering program from a storage medium. In this way, each part described above is loaded onto the main storage unit, so that the content storage controller, the content designation receiver, the license processor, the use condition determining unit, the content renderer, the operation execution command generator and the rendering history data storage unit are generated on the main storage unit.

As described above, the digital content rendering apparatus according to the invention, the digital content rendering method, the digital content rendering program and the recording medium for recording the digital content rendering program according to this invention are suitably applicable to the digital content rendering apparatus for rendering the digital contents based on the license information defining the specifics of permission of the rendering operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for rendering a digital content having license information, comprising:
   a license processor that acquires a constraint from the license information defining specifics of permission of a rendering operation of the digital content, the constraint defining conditions between rendering of the digital content designated for rendering and rendering of a constraint content other than the digital content designated for rendering;
   an operation execution command generator that generates an operation execution command for rendering the digital content designated for rendering and the constraint content according to the constraint acquired by the license processor; and
   a content renderer that renders the digital content designated for rendering and the constraint content based on the operation execution command generated by the operation execution command generator, wherein
   the license processor acquires, as a complementary constraint, a spatial constraint indicating a positional relationship on a rendering screen between the digital content and the constraint content, and the operation execution command generator generates an operation execution command for arranging the digital content and the constraint content according to the positional relationship on the rendering screen defined in the spatial constraint acquired by the license processor.

2. A computer program product having a computer readable medium including programmed instructions, wherein the instructions, when executed by a computer, cause the computer to perform:

acquiring a constraint from license information of a digital content, the constraint defining conditions between rendering of the digital content designated for rendering and rendering of a constraint content other than the digital content designated for rendering, the license information defining specifics of permission of a rendering operation;

generating an operation execution command for rendering the digital content designated for rendering and the constraint content according to the constraint; and rendering the digital content designated for rendering and the constraint content based on the operation execution command, wherein the acquiring includes acquiring, as a complementary constraint, a spatial constraint indicating a positional relationship on a rendering screen between the digital content and the constraint content, and the generating includes generating an operation execution command for arranging the digital content and the constraint content according to the positional relationship on the rendering screen defined in the spatial constraint.

* * * * *